US011631024B2

(12) United States Patent
Endres et al.

(10) Patent No.: US 11,631,024 B2
(45) Date of Patent: Apr. 18, 2023

(54) CONTROLLING, DETECTING AND ENTANGLING ALKALINE-EARTH RYDBERG ATOMS IN TWEEZER ARRAYS

(71) Applicant: California Institute of Technology, Pasadena, CA (US)

(72) Inventors: Manuel Endres, Pasadena, CA (US); Alexandre Cooper-Roy, Downey, CA (US); Jacob P. Covey, Pasadena, CA (US); Ivaylo S. Madjarov, Pasadena, CA (US); Adam L. Shaw, Pasadena, CA (US); Vladimir Schkolnik, Pasadena, CA (US); Jason R. Williams, Castaic, CA (US); Joonhee Choi, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

(21) Appl. No.: 17/172,885

(22) Filed: Feb. 10, 2021

(65) Prior Publication Data
US 2022/0238245 A1 Jul. 28, 2022

Related U.S. Application Data

(60) Provisional application No. 62/972,400, filed on Feb. 10, 2020.

(51) Int. Cl.
*G06N 10/00* (2022.01)
*H04B 10/70* (2013.01)
(Continued)

(52) U.S. Cl.
CPC .............. *G06N 10/00* (2019.01); *B82Y 10/00* (2013.01); *B82Y 20/00* (2013.01); *G01N 24/006* (2013.01); *G21K 1/003* (2013.01); *H04B 10/70* (2013.01)

(58) Field of Classification Search
CPC ........ G06N 10/00; B82Y 10/00; B82Y 20/00; G01N 24/006; G21K 1/003; H04B 10/70
(Continued)

(56) References Cited

U.S. PATENT DOCUMENTS 9,659,651 B1 * 5/2017 Aitken ................. C03C 13/043
10,304,536 B2 * 5/2019 Brown ................. C04B 35/486
(Continued)

FOREIGN PATENT DOCUMENTS

| AU | 2020432930 | 9/2021 |
|----|------------|--------|
| WO | 2020102256 | 5/2020 |
| WO | 2021178037 | 9/2021 |

OTHER PUBLICATIONS

Saffman, M., et al., "Quantum information with Rydberg atoms", Reviews of Modern Physics, Jul.-Sep. 2010, pp. 2313-2363, vol. 82.
(Continued)

*Primary Examiner* — Nicole M Ippolito
(74) *Attorney, Agent, or Firm* — Gates & Cooper LLP

(57) ABSTRACT

An apparatus useful for creating and measuring states of an entangled system, comprising a pair of interacting multi-level systems, each of systems comprising a state $|g\rangle$; a state $|r\rangle$, and state $|r^*\rangle$. One or more first electromagnetic fields excite a first transition between the ground state $|g\rangle$ and the state $|r\rangle$ to create an entangled system. One or more second electromagnetic fields are tuned between the state $|r\rangle$ and the intermediate state $|r^*\rangle$ so that any population of the systems in $|r^*\rangle$ are dark to a subsequent detection of a population in the systems in $|g\rangle$, providing a means to distinguish the entangled system in the state $|g\rangle$ and the entangled system in the state $|r\rangle$. In one or more examples, the systems comprise neutral Rydberg atoms.

20 Claims, 10 Drawing Sheets

(51) Int. Cl.
B82Y 10/00 (2011.01)
G01N 24/00 (2006.01)
B82Y 20/00 (2011.01)
G21K 1/00 (2006.01)

(58) Field of Classification Search
USPC .......................................................... 250/251
See application file for complete search history.

(56) References Cited

U.S. PATENT DOCUMENTS

| | | | |
|---|---|---|---|
| 10,504,033 B1 | 12/2019 | King et al. | |
| 2005/0006593 A1* | 1/2005 | Kastella | H04B 10/70 |
| | | | 250/458.1 |
| 2007/0252081 A1* | 11/2007 | Munro | B82Y 10/00 |
| | | | 250/281 |
| 2019/0219644 A1* | 7/2019 | Lukin | G01N 24/08 |
| 2020/0175411 A1 | 6/2020 | King et al. | |
| 2021/0049494 A1 | 2/2021 | King et al. | |
| 2021/0049495 A1 | 2/2021 | King et al. | |

OTHER PUBLICATIONS

Browaeys, A., "Experimental investigations of dipole-dipole interactions between a few Rydberg atoms", Journal of Physics B: Atomic, Molecular and Optical Physics, 2016, pp. 1-19, vol. 49, No. 15.
Saffman, M., "Quantum computing with atomic qubits and Rydberg interactions: Progress and challenges", Journal of Physics B: Atomic, Molecular and Optical Physics, 2016, pp. 1-27, vol. 49, No. 20.
Browaeys, A., et al., "Many-Body Physics with Individually-Controlled Rydberg Atoms", Nature Physics, Feb. 2020, pp. 132-142, vol. 16.
Schaub, P., et al., "Crystallization in Ising quantum magnets", Science, Mar. 2015, pp. 1455-1458, vol. 347, Issue 6229.
Labuhn, H., et al., "Tunable two-dimensional arrays of single Rydberg atoms for realizing quantum Ising models", Nature, Jun. 2016, pp. 667-670, vol. 534.
Bernien, H., et al., "Probing many-body dynamics on a 51-atom quantum simulator", Nature, 2017, pp. 579-584, vol. 551.
Jau, Y-Y, et al., "Entangling Atomic Spins with a Strong Rydberg-Dressed Interaction", Nature Physics, 2016, pp. 71-74, vol. 12.
Graham, T.M., et al., "Rydberg-Mediated Entanglement in a Two-Dimensional Neutral Atom Qubit Array", Physical Review Letters, 2019, pp. 230501-1-230501-24, vol. 123.
Levine, H., et al., "Parallel Implementation of High-Fidelity Multiqubit Gates with Neutral Atoms", Physical Review Letters, 2019, pp. 170503-1-170503-6, vol. 123, No. 17.
Omran, A., et al., Generation and manipulation of Schrödinger cat states in Rydberg atom arrays, Science, Aug. 2019, pp. 570-574, vol. 365.
Kumar, A., et al., "Sorting ultracold atoms in a three-dimensional optical lattice in a realization of Maxwell's demon", Nature, Sep. 2018, pp. 83-87, vol. 561.
Monz, T., et al., "14-qubit entanglement: creation and coherence", Phys. Rev. Lett., 2011, pp. 1-4, vol. 106, No. 13.
Song, C., et al., "Observation of multi-component atomic Schrödinger cat states of up to 20 qubits", Sciene, 2019, pp. 574-577, vol. 365.
Barredo, D., et al., "An atom-by-atom assembler of defect-free arbitrary 2d atomic arrays", Science, 2016, pp. 1021-1023, vol. 354.
Endres, M., et al., "Atom-by-atom assembly of defect-free one-dimensional cold atom arrays", Science, Nov. 2016, pp. 1024-1027, vol. 354, Issue 6315.
Desalvo, B.J., et al., "Rydberg-Blockade Effects in Autler-Townes Spectra of Ultracold Strontium", Physical Review A, 2016, pp. 022709-1-022709-10, vol. 93.
Gaul, C., et al., "Resonant Rydberg Dressing of Alkaline-Earth Atoms via Electromagnetically Induced Transparency", Physical Review Letters, 2016, pp. 1-7, vol. 116, No. 24.
Norcia, M.A., et al., "Microscopic Control and Detection of Ultracold Strontium in Optical-Tweezer Arrays", Physical Review X, 2018, pp. 041054-1-041054-14, vol. 8.
Norcia, M.A., et al., "Seconds-scale coherence on an optical clock transition in a tweezer array", Science, 2019, pp. 93-97, vol. 366.
Pichler, H., et al., "Quantum Optimization for Maximum Independent Set Using Rydberg Atom Arrays", arXiv:1808.10816, 2018, pp. 1-13.
Barredo, D., et al., "Three-dimensional trapping of individual Rydberg atoms in ponderomotive bottle beam traps", arXiv:1908.00853, 2019, pp. 1-8.
Welte, S., et al., "Photon-Mediated Quantum Gate between Two Neutral Atoms in an Optical Cavity", Physical Review X, 2018, pp. 011018-1-011018-11.
Saskin, S., et al., "Narrow-Line Cooling and Imaging of Ytterbium Atoms in an Optical Tweezer Array", Phys. Rev. Lett., 2019, pp. 1-7, vol. 122, 143002.
Ludlow, A.D., et al., "Optical atomic clocks", Reviews of Modern Physics, Apr.-Jun. 2015, pp. 637-701, vol. 87, No. 2.
Gil, L.I.R., et al., "Spin Squeezing in a Rydberg Lattice Clock", Physical Review Letters, Mar. 2014, pp. 103601-1-103601-5, vol. 112.
Kessler, E.M., et al., "Heisenberg-Limited Atom Clocks Based on Entangled Qubits", Physical Review Letters, May 2014, pp. 190403-1-190403-5, vol. 112.
Kaubruegger, R., et al., "Variational Spin-Squeezing Algorithms on Programmable Quantum Sensors", Physical Review Letters, 2019, pp. 260505-1-260505-6, vol. 123.
Komar, P., et al., "A quantum network of clocks", Nature Physics, Aug. 2014, pp. 582-587, vol. 10.
Daley, A.J., et al., "Quantum Computing with Alkaline-Earth-Metal Atoms", Physical Review Letters, Oct. 2008, pp. 170504-1-170504-4, vol. 101.
Gorshkov, A.V., et al., "Alkaline-Earth-Metal Atoms as Few-Qubit Quantum Registers", Physical Review Letters, Mar. 2009, pp. 110503-1-110503-4, vol. 102.
Kaufman, A.M., et al., "Entangling two transportable neutral atoms via local spin exchange", Nature, 2015, pp. 208-211, vol. 527.
Cirac, J.I., et al., "A scalable quantum computer with ions in an array of microtraps", Nature, Apr. 2000, pp. 579-581, vol. 404.
Wilson, J.T., et al., "Trapped arrays of alkaline earth Rydberg atoms in optical tweezers",. arXiv:1912.08754, 2019, pp. 1-15.
Knill, E., "Quantum computing with realistically noisy devices", Nature, Mar. 2005, pp. 39-44, vol. 434.
Barredo, D., et al., "Synthetic three-dimensional atomic structures assembled atom by atom", Nature, Sep. 2008, pp. 79-82, vol. 561.
Mukherjee, R., et al., "Many-body Physics with Alkaline-Earth Rydberg lattices", Journal of Physics B Atomic Molecular and Optical Physics, Feb. 2011, pp. 1 15, vol. 44, No. 18.
Arute, F., et al., "Quantum supremacy using a programmable superconducting processor", Nature, Oct. 2019, pp. 505-510, vol. 574.
Madjarov, I.S., et al., "High-fidelity entanglement and detection of alkaline-earth Rydberg atoms", Nature Physics, Aug. 2020, pp. 857-861, vol. 16.
Wang, Y., et al., "Single-qubit gates based on targeted phase shifts in a 3D neutral atom array", Science, Jun. 2016, pp. 1562-1565, vol. 352, Issue 6293.
Langin, T.K., et al., "Laser cooling of ions in a neutral plasma", Science, 2019, pp. 61-64, vol. 363.
Barber, Z.W., et al., "Direct excitation of the forbidden clock transition in neutral 174Yb atoms confined to an optical lattice", Physical Review Letters, Mar. 2006, pp. 1-5, vol. 96, No. 8.
Karpa, L., et al., "Suppression of Ion Transport due to Long-Lived Sub-Wavelength Localization by an Optical Lattice", Phys. Rev. Lett. 2013, pp. 1-5, vol. 111.
Huber, T., et al., "A far-off-resonance optical trap for a Ba+ ion", Nature Communications, 2014, pp. 1-7, vol. 5, No. 5587.
Taichenachev, A.V., et al., "Magnetic field-induced spectroscopy of forbidden optical transitions with application to lattice-based optical atomic clocks", Physical Review Letters, 2006, pp. 083001-1-083001-4, vol. 96.
Engel, F., et al., "Observation of Rydberg Blockade Induced by a Single Ion", Phys. Rev. Lett., 2018, pp. 1-7, vol. 121.

(56) References Cited

OTHER PUBLICATIONS

Mukherjee, R., "Charge dynamics of a molecular ion immersed in a Rydberg-dressed atomic lattice gas", Physical Review A, Jan. 2019, pp. 1-9, vol. 100.

Madjarov, I.S., et al., "An Atomic Array Optical Clock with Single-Atom Readout", Phys. Rev. X, 2019, pp. 1-13, vol. 9, 041052.

Vaillant, C.L., et al., "Long-range Rydberg-Rydberg interactions in calcium, strontium and ytterbium", Journal of Physics B: Atomic, Molecular and Optical Physics, 2012, pp. 1-11, vol. 45.

Levine, H., et al., "High-Fidelity Control and Entanglement of Rydberg-Atom Qubits", Physical Review Letters, 2018, pp. 123603-1-123603-6, vol. 121.

Cooke, W.E., et al., "Doubly Excited Autoionizing Rydberg States of Sr", Physical Review Letters, Jan. 16, 1978, pp. 178-181, vol. 40, No. 3.

Loghead, G., et al., "Number-resolved imaging of excited-state atoms using a scanning autoionization microscope", Physical Review A, 2013, pp. 053409-1-053409-4, vol. 87.

Itano, W.M., et al., "Quantum Zeno effect", Physical Review A, Mar. 1990, pp. 2295-2300, vol. 41, No. 5.

Zhu, B., et al., "Suppressing the Loss of Ultracold Molecules Via the Continuous Quantum Zeno Effect", Physical Review Letters, Feb. 2014, pp. 070404-1-070404-5 and Supplementary Information, vol. 112.

Cooper, A., et al., "Alkaline-Earth Atoms in Optical Tweezers", Physical Review X, 2018, pp. 041055-1-041055-19, vol. 8.

Covey, J.P., et al., "2000-Times Repeated Imaging of Strontium Atoms in Clock-Magic Tweezer Arrays", Physical Review Letters, 2019, pp. 173201-1-173201-6, vol. 122.

Leibfried, D., et al., "Creation of a six-atom 'Schrödinger cat' state", Nature, Dec. 2005, pp. 639-642, vol. 438.

Anderson, D.Z., et al., "Mirror reflectometer based on optical cavity decay time", Applied Optics, Apr. 1984, pp. 1238-1245, vol. 23, No. 8.

De Leseleuc, S., et al., "Analysis of imperfections in the coherent optical excitation of single atoms to Rydberg states", Physical Review A, 2018, pp. 053803-1-053803-9, vol. 97.

Weber, S., et al., "Calculation of Rydberg interaction potentials", Journal of Physics B: Atomic, Molecular and Optical Physics, 2017, pp. 1-18, vol. 50.

\* cited by examiner

CONTROLLING, DETECTING AND ENTANGLING ALKALINE-EARTH RYDBERG ATOMS IN TWEEZER ARRAYS

CROSS REFERENCE TO RELATED APPLICATIONS

This application claims the benefit under 35 U.S.C. Section 119(e) of and commonly-assigned U.S. Provisional Patent Application No. 62/972,400, filed Feb. 10, 2020, by Manuel Endres, Alexandre Cooper-Roy, Jacob P. Covey, Ivaylo Madjarov, Adam L. Shaw, Vladimir Schkolnik, Jason R. Williams, and Joonhee Choi, entitled "CONTROLLING, DETECTING AND ENTANGLING ALKALINE-EARTH RYDBERG ATOMS IN TWEEZER ARRAYS";

which application is incorporated by reference herein.

STATEMENT REGARDING FEDERALLY SPONSORED RESEARCH AND DEVELOPMENT

This invention was made with government support under Grant No. FA9550-19-1-0044 awarded by the Air Force and under Grant No(s). PHY1733907 and PHY1753386 awarded by the National Science Foundation. The government has certain rights in the invention.

BACKGROUND OF THE INVENTION

1. Field of the Invention

The present invention relates to systems and methods for creating entangled quantum states.

2. Description of the Related Art

Recent years have seen remarkable advances in generating strong, coherent interactions in arrays of neutral atoms through excitation to Rydberg states, characterized by large electronic orbits[1-4]. This has led to profound results in quantum science applications, such as quantum simulation[4-7] and quantum computing[2,3,8-11], including a record for two-atom entanglement for neutral atoms[9]. Furthermore, up to 20-qubit entangled states have been generated in Rydberg arrays[12], competitive with results in trapped ions[13] and superconducting circuits[14]. Many of these developments were fueled by novel techniques for generating reconfigurable atomic arrays[15-17] and mitigation of noise sources[9,18]. While Rydberg-atom-array experiments have utilized alkali species, atoms with a more complex level structure, such as alkaline-earth atoms (AEAs)[19-24] commonly used in optical lattice clocks[25], provide new opportunities for increasing fidelities and accessing fundamentally different applications, including Rydberg-based quantum metrology[26-28], quantum clock networks[29], and quantum computing schemes with optical and nuclear qubits[30,31]. The present disclosure satisfies this need.

SUMMARY OF THE INVENTION

Illustrative, non-exclusive examples of inventive subject matter according to the present disclosure are described in the following examples.

1. An apparatus useful for creating and measuring states of an entangled system, comprising:

a pair of interacting multi-level systems, each of systems comprising:

a ground state |g>;

a state |r>, wherein the interaction is such that excitation to the state |r> in one of the systems prevents excitation to the state |r> in the other of the systems; and an intermediate state |r*>, wherein a population of the systems in state |r*> does not decay to the state |g>;

one or more sources of coherent electromagnetic radiation coupled to the systems and emitting:

one or more first electromagnetic fields tuned to excite a first transition between the state ground |g> and the state |r>, wherein the excitation of the first transition creates an entangled system comprising an entanglement of the pair of interacting multi-level systems;

one or more second electromagnetic fields tuned between the state |r> and the intermediate state |r*> to excite a second transition to the state |r*> so that any population of the systems in |r*> are dark to a subsequent detection of a population in the systems in |g>, providing a means to distinguish the entangled system in the state |g> and the entangled system in the state |r>; and a detection system performing the detection of whether there is a population of the entangled system in the ground state |g>.

2. The apparatus of example 1, wherein:

each of the systems include:

an auxiliary state |a>, such that the entangled system in state |g> does not decay to the auxiliary state |a> and a transition from the auxiliary state |a> to the state |r> is forbidden; and a state |f> having an energy higher than state |a>, such that the intermediate state |r*> is not electromagnetically coupled to the state |f>;

the one or more sources of coherent electromagnetic radiation emit:

one or more third electromagnetic fields:

exciting a third transition from the ground state |g> to state |f>; or exciting a fourth transition from the ground state |g> to the auxiliary state |a> and then a fifth transition from auxiliary state |a> to the state |f>; and the detection system comprises a detector and the one or more sources emitting one or more fourth electromagnetic fields exciting a sixth transition from the auxiliary state |a> to the state |f>, such that the detector detecting spontaneous emission from the state |f> in response to excitation of the sixth transition indicates a population of the entangled system in the ground state |g>.

3. The apparatus of example 1 or example 2, wherein the systems comprise Rydberg atoms, the state |r> is a Rydberg state, and the pair of Rydberg atoms are separated by a distance less than or equal to a Rydberg blockade radius so that the interacting comprises a Rydberg blockade.

4. The apparatus of example 3, wherein the systems comprise alkaline earth atoms or alkaline earth-like atoms.

5. The apparatus of example 4, wherein the atoms comprise Strontium, Ytterbium, or an atom having two valence electrons including one electron that can be excited from the core ion and one electron that can be in the state |r>.

6. The apparatus of example 3, wherein:

the state |r> is defined as $n_G s n_R s\ ^3S_1$, where $n_R \geq 30$ is the principal quantum number of the |r> state, $n_G$ is the principal quantum number of the ground state |g>, s is the angular momentum quantum number, and S is a term symbol representing the total orbital angular momentum quantum number of the multi-electron atom;

the state |g> is defined as $n_G sn_G p\ ^3P_0$, where p is the angular momentum quantum number, and P is the total orbital angular momentum quantum number for the multi-electron atom; and the intermediate state |r*> is defined as $n_G sn_R s\ ^3S_1$.

7. The apparatus of any of the examples 1-6, further comprising a trap comprising trapping potentials trapping an array of the multi-level systems, each of the trapping potentials trapping a single one of the atoms.

8. The apparatus of example 7, wherein the trap comprises optical tweezers.

9. The apparatus of example 7, further comprising a controller (e.g., a computer) controlling the trapping potentials so that the detection mechanism measures whether there is a population of the entangled system in the ground state |g> while the systems are trapped in the trapping potentials.

10. A quantum computer, a sensor, a clock, or a quantum simulator comprising the apparatus of any of the examples 1-9.

11. The apparatus of any of the examples 1-10, wherein the detection mechanism is used to measure a state of a qubit comprising the ground state |g> and the state |r>.

12. The apparatus of any of the examples 1-11, wherein the interaction, preventing excitation to the state |r> in one of the systems prevents when there is excitation to the state |r> in the other of the systems, comprises a dipole interaction, an electrostatic interaction, or an electromagnetic interaction.

13. The apparatus of any of the examples 1-13, wherein |r*> is a short-lived compared to timescale for a transition from |r> to |g> (e.g., at least 100 times faster) and/or |r*> is an autoionizing state.

14. The apparatus of any of the examples 1-13, wherein |r*> transitions to a dark state of the system faster than a transition from |r*> to |r>.

15. The apparatus of claim 1, wherein the systems comprise atoms, quantum dots, defects in solid state, a superconductor, or a charge qubit circuit.

16. The apparatus wherein the electromagnetic fields are outputted from one or a plurality of lasers.

BRIEF DESCRIPTION OF THE DRAWINGS

Referring now to the drawings in which like reference numbers represent corresponding parts throughout:

FIG. 1A shows the relevant level structure (left), and electronic configuration (right) for strontium 88. The Rydberg-ground state qubit is defined by a metastable 'clock' state g and the 5s61s 3S1 mJ=0 Rydberg state r (highlighted with a purple box), which we detect by driving to an auto-ionizing 5p61s state r*. The clock state g is initialized from the absolute ground state a. FIG. 1B illustrates atom-by-atom assembly in optical tweezers to prepare an effectively non-interacting configuration ((i), blue box and data-points throughout) and a strongly Rydberg-blockaded pair configuration ((ii), red box and data-points throughout) 7. The blockade radius RB, where two-atom excitation is suppressed, is indicated by a dashed circle. Throughout, purple and black circles indicate r and g atoms, respectively. The Rydberg, auto-ionization, and clock beams all propagate along the axis of the atom array and address all atoms simultaneously. Averaged fluorescence images of atoms in configurations (i) and (ii) are shown.

FIG. 3A shows Array-averaged Rabi oscillations for the non-interacting configuration (i), depicted by the inset. We operate with OR=2πx6.0 MHz. By fitting with a Gaussian profile, we find a 1/e coherence of ≈42 cycles. FIG. 3B shows same as in FIG. 3A but for the blockaded configuration (ii), depicted by the inset. We plot 1−P{01}, where P{01} is the array-averaged symmetrized probability of detecting one atom of an initial pair (and not both). We observe a blockade-enhanced Rabi frequency of $\Omega\sim R=2\pi\times 8.5$ MHz. We find a 1/e coherence of 60 cycles. In both a and b, data is uncorrected and averaged over 10 experimental cycles per timestep and over an array of approximately 14 atoms in a or 10 pairs in b. Error bars indicate a 1σ binomial confidence interval.

FIG. 9A shows the differential shift of the $|g\rangle \leftrightarrow |r\rangle$ resonance between $\Omega_R^{init}$=271×1 MHz and variable $\Omega_R$ versus $\Omega^2_R$. This set of data was measured with the two-rail self-comparison technique utilized in Ref[1]. The fit line reflects the quadratic scaling $\Delta\nu = \kappa^{UV}_{|r\rangle}\Omega^2 R$ with $\kappa^{UV}_{|r\rangle}$=5.1(7) kHz/MHz$^2$. FIG. 9B shows the differential shift of the $|g\rangle \leftrightarrow |r\rangle$ resonance between the dark case U=0 where the tweezers are extinguished during excitation, and the bright case with variable $|g\rangle$-state depth U up to U0≈kB×450 µK≈h×9.4 MHz. This fit shows a linear dependence with $\Delta\nu = \kappa^T_{|r\rangle}U$, where $\kappa^T_{|r\rangle}$=18.8(9) MHz/U0. Error bars indicate a 1a standard error of the mean.

DETAILED DESCRIPTION OF THE INVENTION

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Technical Description

Apparatus Structure

Figures 1A, 1B:
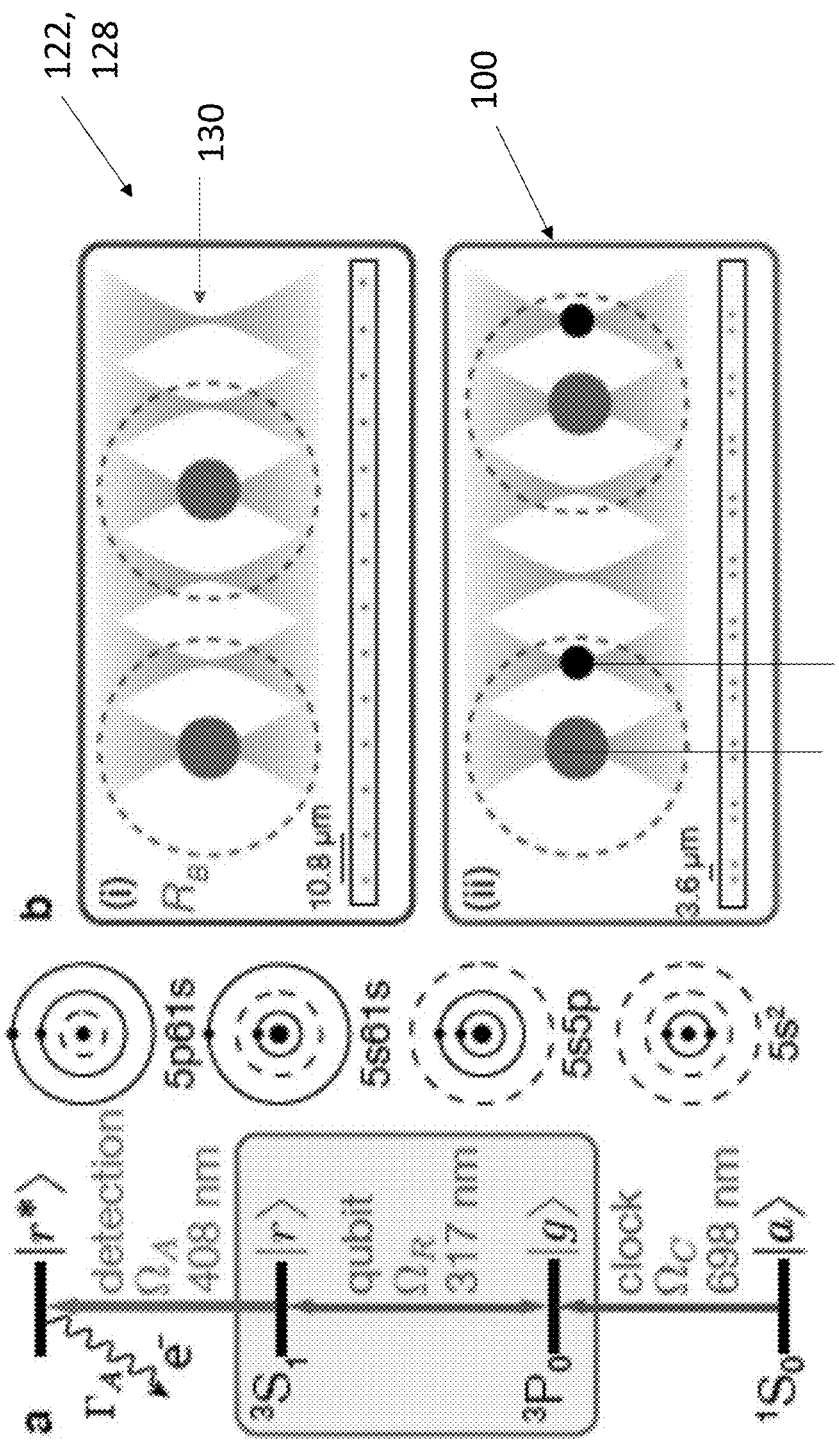
FIG. 1A and FIG. 1B. Population and detection of Rydberg states in non-interacting and interacting configurations.

FIG. 1A and FIG. 1B illustrate a pair 100 of interacting multi-level systems 102 (e.g., an atom), each of systems 102a, 102b comprising a ground state $|g\rangle$; a state $|r\rangle$ and an intermediate state $|r^*\rangle$, wherein a population of the systems in state $|r^*\rangle$ does not decay to the state $|g\rangle$. The interaction between the multi-level systems 102a, 102b is such that excitation to the state $|r\rangle$ in one of the systems 102a prevents excitation to the state $|r\rangle$ in the other of the systems 102b.

Figure 1C:
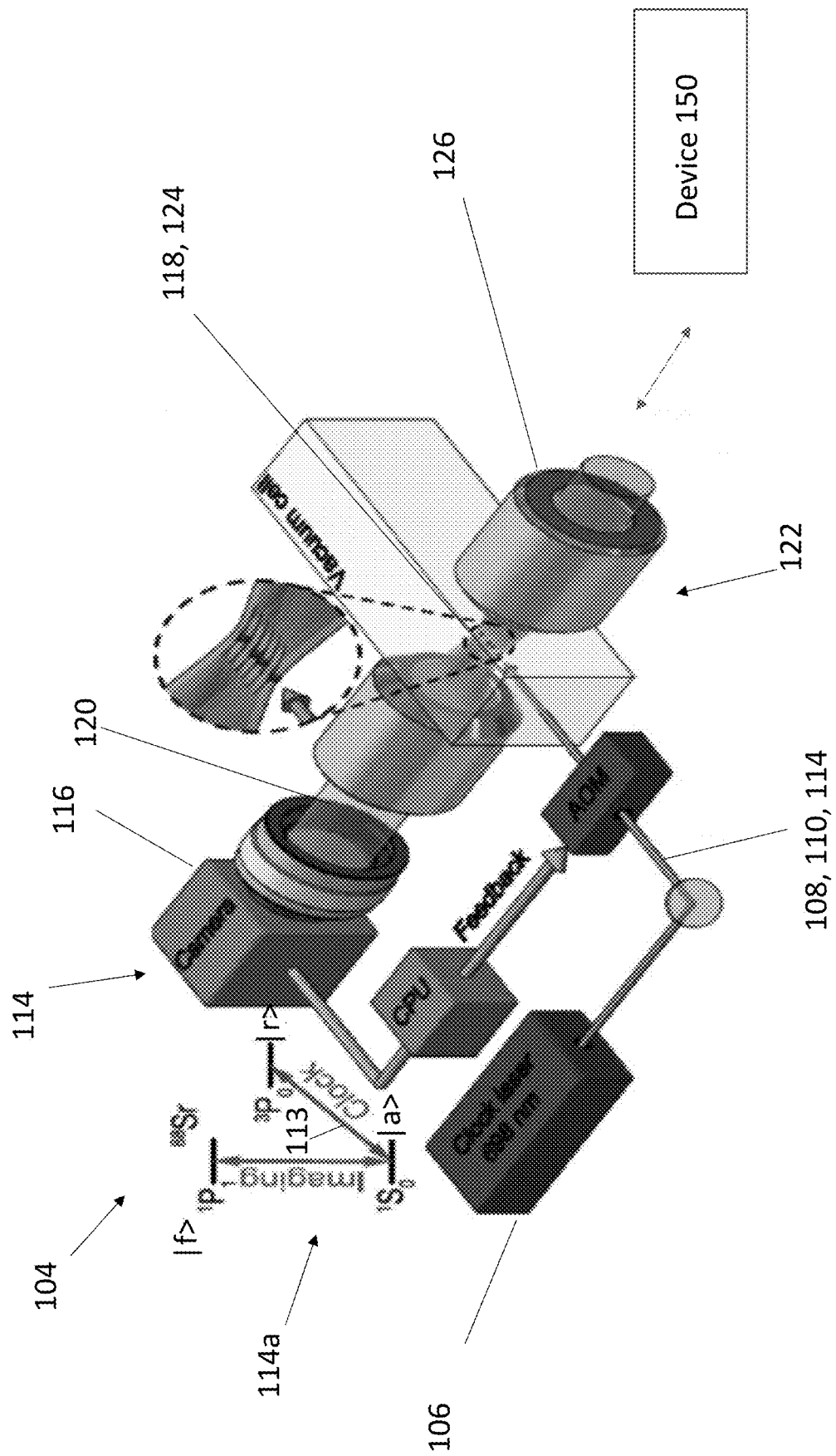
FIG. 1C illustrates an apparatus for creating and measuring states of an entangled system.

FIG. 1B and FIG. 1C illustrate an apparatus 104 for creating and measuring states of the entangled system 103 comprising the pair of multi-level systems 102. The apparatus includes one or more sources 106 of coherent electromagnetic radiation (e.g., one or more lasers) emitting first electromagnetic radiation comprising one or more first electromagnetic fields 108, and second electromagnetic radiation comprising one or more second electromagnetic fields 110. The one or more first electromagnetic fields are tuned (wavelength and/or polarization) to excite a first transition between the ground state $|g\rangle$ and the state $|r\rangle$, so that the excitation of the first transition creates an entangled system comprising an entanglement of the pair of interacting multi-level systems. The one or more second electromagnetic fields are tuned (e.g., wavelength and polarization) to excite a second transition between the state $|r\rangle$ and the state $|r^*\rangle$ so that any population of the systems in $|r^*\rangle$ are dark to a subsequent detection of a population in the systems in $|g\rangle$, providing a means to distinguish the entangled system in the state $|g\rangle$ and the entangled system in the state $|r\rangle$. The apparatus further includes a detection system 114 performing the detection of whether there is a population of the entangled system in the ground state $|g\rangle$. In one or more examples, detection or measurement of the population in the ground state $|g\rangle$ allows inferring occupation of an entangled state or the state $|r\rangle$.

In one or more examples illustrated in FIG. 1B, the systems further include an auxiliary state $|a\rangle$, such that the entangled system in state $|g\rangle$ does not decay to the auxiliary state $|a\rangle$ and a transition from the auxiliary state $|a\rangle$ to the state $|r\rangle$ is forbidden; and a state $|f\rangle$ having an energy higher than state $|a\rangle$, such that the intermediate state $|r^*\rangle$ is not electromagnetically coupled to the state $|f\rangle$. In this example, the one or more sources of coherent electromagnetic radiation emit one or more third electromagnetic fields 114 (i) exciting a third transition from the ground state $|g\rangle$ to state $|f\rangle$; or (ii) exciting a fourth transition from the ground state $|g\rangle$ to the auxiliary state $|a\rangle$ (e.g., clock transition) and then a fifth transition 114b from auxiliary state $|a\rangle$ to the state $|f\rangle$.

In various examples, the detection system 112 comprises a detector 116 and the one or more sources emitting one or more fourth electromagnetic fields 118 exciting the fifth transition 114a from the auxiliary state $|a\rangle$ to the state $|f\rangle$, such that the detector 116 detecting spontaneous emission 120 from the state $|f\rangle$ in response to excitation of the sixth transition indicates a population of the entangled system in the ground state $|g\rangle$. Further information on the detection system can be found in U.S. Pat. No. 10,809,177 entitled "CONTROLLING ALKALINE EARTH ATOMS FOR QUANTUM COMPUTING AND METROLOGY APPLICATIONS," which patent is incorporated by reference herein.

In the examples illustrated in FIG. 1A-1C, the apparatus further comprises a trap 122 (e.g., optical tweezers) comprising trapping potentials trapping an array 128 of the multi-level systems 102, each of the trapping potentials trapping a single one of the systems (e.g., an atom). As illustrated in FIG. 1A and FIG. 1C, the optical tweezers comprise fifth electromagnetic radiation 124 comprising one or more fifth electromagnetic fields (emitted from a laser), optics, and/or diffractive elements. In one or more examples, the optics includes one or more objectives 126 focusing the fifth electromagnetic radiation at one or more foci 130 so as to generate each of the trapping potentials at each of the foci.

FIG. 1C further illustrates a controller (e.g., a computer, processor, CPU) controlling the trapping potentials and the electromagnetic fields so that the detection mechanism is capable of measuring whether there is a population of the entangled system in the ground state $|g\rangle$ while the systems are trapped in the trapping potentials.

FIG. 1C further illustrates a device 150 (quantum computer, a sensor, a clock, or a quantum simulator) coupled to or comprising the apparatus 104.

In various examples, the systems comprise Rydberg atoms, the state $|r\rangle$ is a Rydberg state, and the pair of Rydberg atoms are separated by a distance less than or equal to a Rydberg blockade radius so that the interacting comprises a Rydberg blockade. In the following section an example wherein the Rydberg atoms comprise alkaline earth atoms is discussed.

Example with Rydberg Atoms

In this section we demonstrate a novel Rydberg array architecture based on AEAs, where we utilize the two-valence electron structure for single-photon Rydberg excitation from a meta-stable clock state as well as auto-ionization detection of Rydberg atoms (FIG. 1). We find leading fidelities for Rydberg state detection, ground- to Rydberg-state coherent operations, and Rydberg-based two-atom entanglement (Table I). More generally, our results constitute the highest reported two-atom entanglement fidelities for neutral atoms[9,32,33] as well as a proof-of-principle for controlled two-atom entanglement between AEAs. We further demonstrate a high-fidelity entanglement operation with optical traps kept on, an important step for gate-based quantum computing[1-3,8-11]. Our results open up a host of new opportunities for quantum metrology and computing as well as for optical trapping of ions.

TABLE I

Uncorrected and SPAM-corrected fidelities for single-atom and Rydberg-blockaded pulses. The 'T' indicates settings where the tweezers are on during Rydberg excitation.

| Quantity | Uncorrected | SPAM-corrected |
|---|---|---|
| Single-atom π-pulse | 0.9951(9) | 0.9967(9) |
| Single-atom 2π-pulse | 0.9951(9) | 0.998(1) |
| Blockaded π-pulse | 0.992(2) | 0.996(2) |
| Blockaded 2π-pulse | 0.992(2) | 0.999(2) |
| Blockaded π-pulse, T | 0.992(2) | 0.996(2) |
| Blockaded 2π-pulse, T | 0.987(2) | 0.994(3) |
| Bell state fidelity | ≥0.980(3) | ≥0.991(4) |
| Bell state fidelity, T | ≥0.975(3) | ≥0.987(4) |

Our experimental system[23,34,35] combines various novel key elements: First, we implement atom-by-atom assembly in reconfigurable tweezer arrays[15,16] for AEAs (FIG. 1b). Second, we sidestep the typical protocol for two-photon excitation to S-series Rydberg states, which requires significantly higher laser power to suppress intermediate state scattering, by transferring atoms to the long-lived $^3P_0$ clock state $|g\rangle$[25,34-36]. We treat $|g\rangle$ as an effective ground state from which we apply single-photon excitation to a $^3S_1$ Rydberg state $|r\rangle$[26]. Third, instead of relying on loss through tweezer anti-trapping as in alkali systems, we employ a rapid autoionization scheme for Rydberg state detection. In contrast to earlier implementations of auto-ionization detection in bulk gases[21], we image remaining neutral atoms[34] instead of detecting charged particles.

More generally, our findings improve the outlook for Rydberg-based quantum computing[1-3,8-11], optimization[37], and simulation[4-7]. These applications all rely on high fidelities for preparation, detection, single-atom operations, and entanglement generation for which we briefly summarize our results: we obtain a state preparation fidelity of 0.997(1) through a combination of coherent and incoherent transfer[38]. The new auto-ionization scheme markedly improves the Rydberg state detection fidelity to 0.9963-0.9996[9,12,38]. We also push the limits of single and two-qubit operations in ground- to Rydberg-state transitions[6,9,10,12]. For example, we find π-pulse fidelities of 0.9951(9) without correcting for state preparation and measurement (SPAM) and 0.9967(9) if SPAM correction is applied[38]. Finally, using a conservative lower-bound procedure, we observe a two-qubit entangled Bell state fidelity of 0.980(3) and 0.991(4) without and with SPAM correction, respectively. We note that all values are obtained on average and for parallel operation in arrays of 14 atoms or 10 pairs for the non-interacting or pair-interacting case, respectively.

Figure 2:
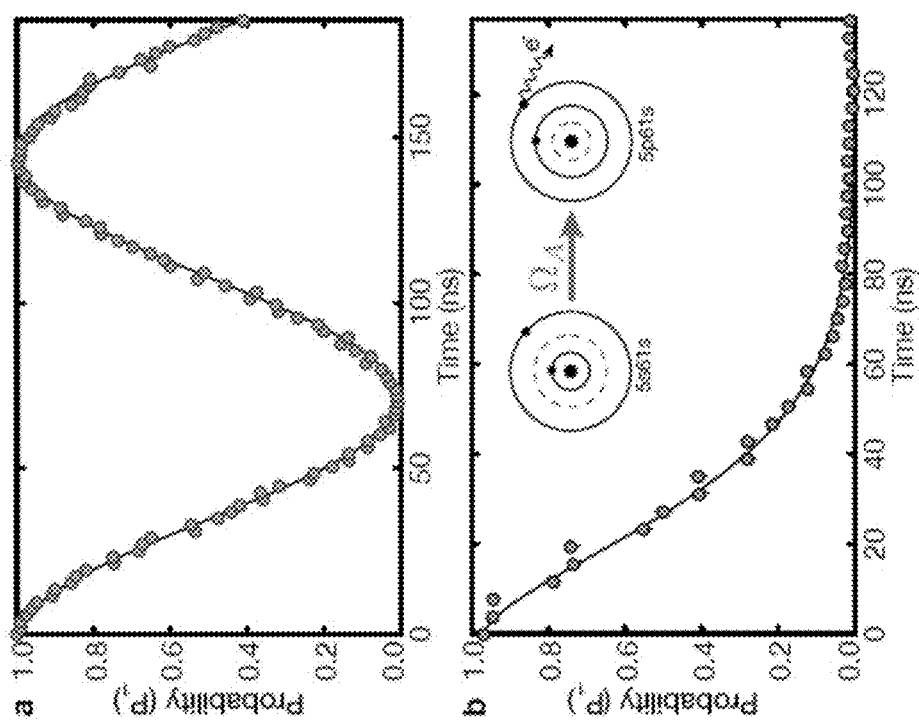
FIG. 2 Rabi oscillations and auto-ionization. a, Array-averaged probability P1 of detecting an atom after a resonant Rydberg pulse and subsequent auto-ionization as a function of Rydberg pulse time, showing high-contrast Rabi oscillations with frequency $\Omega R=2n\ 6.80(2)$ MHz. The auto-ionization pulse time is fixed to 5 μs. b, P1 as a function of auto-ionization pulse time at a fixed Rydberg pulse time of 70 ns corresponding to a π-pulse (followed by a second π-pulse). The solid line is a fit to a Gaussian, phenomenologically chosen to capture the finite switch-on time of the auto-ionization beam[38]. Inset: illustration of the auto-ionization process. In both a and b, data is uncorrected and averaged over 40 100 experimental cycles per timestep and over an array of approximately 14 atoms. Error bars indicate a 1a binomial confidence interval.

We begin by analyzing short-time Rabi oscillations between $|g\rangle$ and $|r\rangle$ (FIG. 2a) and the auto-ionization detection scheme (FIG. 2b) in an essentially non-interacting atomic configuration ((i) in FIG. 1b). To detect atoms in $|r\rangle$ we excite the core valence-electron from a 5s to a 5p level, which then rapidly auto-ionizes the Rydberg electron (inset of FIG. 2b)[38]. The ionized atoms are dark to subsequent detection of atoms in $|g\rangle$[34], providing the means to distinguish ground and Rydberg atoms.

We use a $|g\rangle\leftrightarrow|r\rangle$ Rabi frequency of $\Omega_R\approx 2\pi\times 6-7$ MHz throughout, and observe Rabi oscillations with high contrast at a fixed auto-ionization pulse length (FIG. 2a, Table I). To quantify the auto-ionization detection, we perform a π-pulse on $|g\rangle\leftrightarrow|r\rangle$, then apply an auto-ionization pulse for a variable duration (FIG. 2b), and then perform a second π-pulse on $|g\rangle\leftrightarrow|r\rangle$ before measurement. The detected population decreases to zero with a 1/e time of $\tau_A$=35(1) ns. We can compare $\tau_A$ to the lifetime of $|r\rangle$, which is estimated to be $\tau_{|r\rangle}\approx 80$ μs[39], placing an upper bound on the $|r\rangle$ state detection efficiency of 0.9996(1). A lower bound comes from the measured π-pulse fidelity of 0.9963(9) corrected for preparation and ground state detection errors. These limits can be increased with higher laser power and faster switching[38].

Figures 3A, 3B:
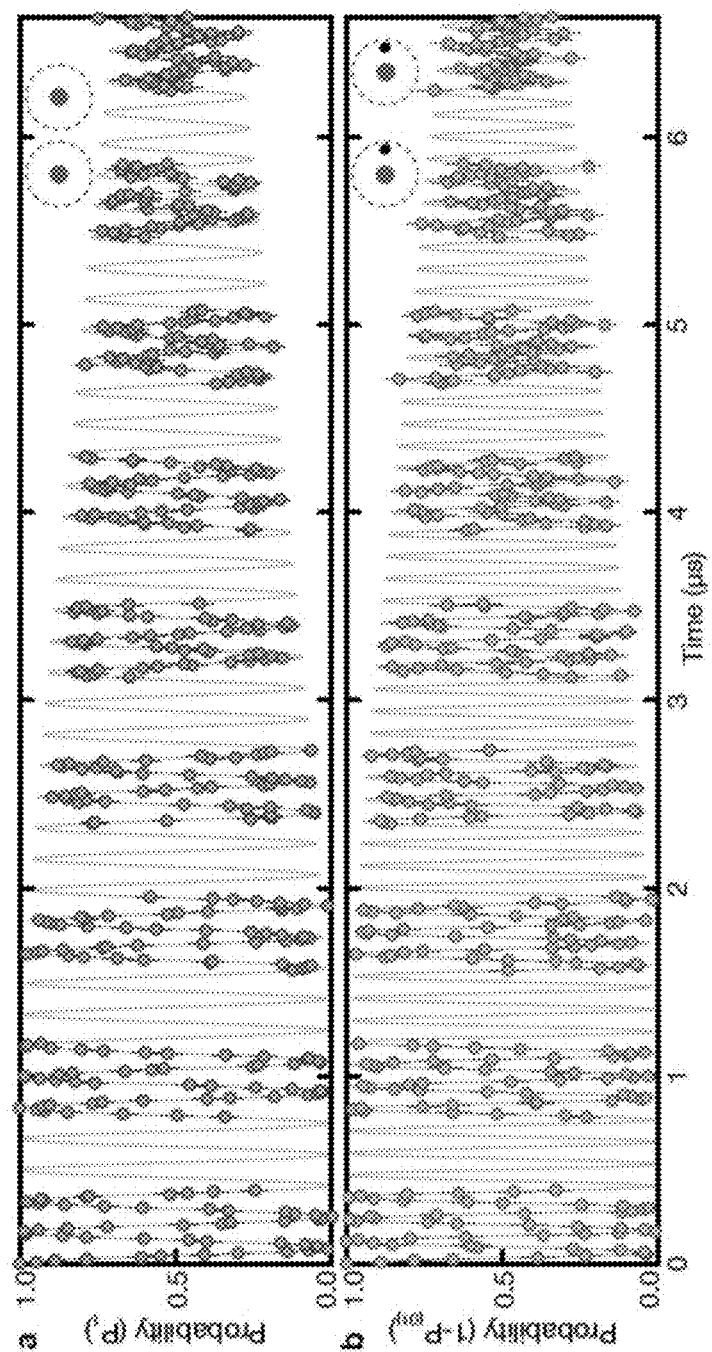
FIG. 3A-3B. Long-time Rabi oscillations for single and blockaded atoms.

To probe our longer-time coherence, we drive the Rydberg transition for as long as 7 μs (FIG. 3a). The decay of the contrast on longer timescales is well modeled by a Gaussian profile of the form $C(t)=C_0 \exp(-t^2/\tau_2)$. We find that $\tau_C\approx 7$ μs is consistent with our data, and corresponds to a 1/e coherence of ≈42 cycles. To our knowledge, this is the largest number of coherent ground-to-Rydberg cycles that has been published to date[9,11]. Limitations to short and long term coherence are discussed and modeled in detail in Ref.[38]. The main contributing factors are laser intensity and phase noise (which both can be improved upon with technical upgrades, such as cavity filtering of phase noise[9]), and finite Rydberg state lifetime.

Figure 4:
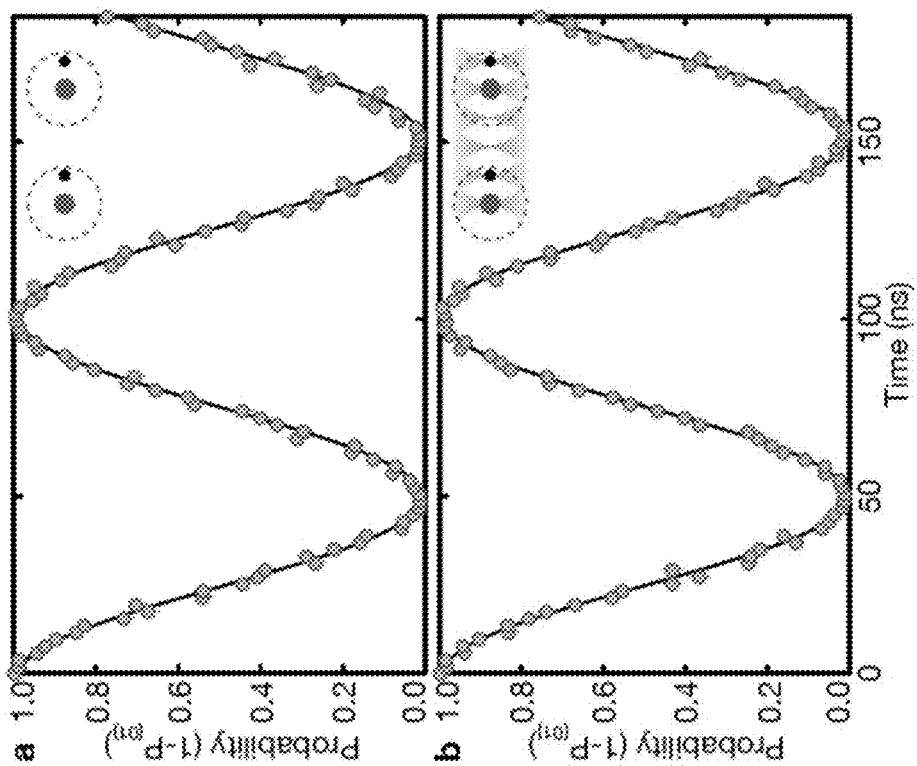
FIG. 4 Short-time Rydberg-blockaded Rabi oscillations with tweezers off and on. a, Short-time Rabi-oscillations for the blockade configuration (ii) with the traps off, depicted by the inset. b, Same as in a but with tweezers on during Rydberg interrogation with a g-state depth of U/h 0.94 MHz. The blockade-enhanced Rabi frequency is $Q\sim R=2\pi\ 9.8$ MHz. In both a and b, data is uncorrected and averaged over 50-100 experimental cycles per timestep and over an array of approximately 10 pairs. Error bars indicate a 1a binomial confidence interval.

We now turn to the pair-interacting configuration ((ii) in FIG. 1b) to study blockaded Rabi oscillations[1,9]. For an array spacing of 3.6 μm, we anticipate an interaction shift of $V_B$ $2\pi$ 130 MHz for the n=61 Rydberg state in the $^3S_1$ series[39]. In this configuration, simultaneous Rydberg excitation of closely-spaced neighbors is strongly suppressed, and an oscillation between $|gg\rangle$ and the entangled W-Bell-state:

$$|W\rangle = (|gr\rangle + e^{i\varphi}|rg\rangle)/\sqrt{2}$$

is predicted with a Rabi frequency enhanced by a factor of $2^1$, as observed in our data. We show our results for long-term coherent oscillations in FIG. 3b and find a 1/e coherence time corresponding to 60 cycles. Results for short-term oscillations are shown in FIG. 4a and the fidelity values are summarized in Table I.

We now estimate the Bell state fidelity associated with a two-atom (blockaded) π-pulse. We provide a lower bound for the Bell state fidelity based on measured populations at the (blockaded) π-time and a lower bound on the purity of the two-atom state. The latter is obtained by measuring the atomic populations at the (blockaded) 2π time, under the assumption that the purity does not increase between the π and the 2π time. For a detailed discussion and analysis of this bound and the validity of the underlying assumptions, see Ref.[38]. With this approach, we find uncorrected and SPAM-corrected lower bounds on the Bell state fidelity of 0.980(3) and 0.991(4), respectively (Table I).

We note that all preceding results were obtained with the tweezers switched off during Rydberg excitation. The potential application of Rydberg gates to large circuit depth quantum computers motivates the study of blockade oscillations with the tweezers on. In particular, we foresee challenges for sequential gate-based platforms if tweezers must be turned off during each operation to achieve high fidelity. In systems implementing gates between the absolute ground and clock states for example, blinking traps on and off will eventually lead to heating and loss, ultimately limiting the number of possible operations. Furthermore, while individual tweezer blinking is possible in one dimension, the prospects for blinking individual tweezers in a two-dimensional array are unclear: a two-dimensional array generated by crossed acousto-optic deflectors cannot be blinked on the level of a single tweezer, and one generated by a spatial light modulator cannot be blinked fast enough to avoid loss. Repulsive traps such as interferometrically-generated bottles[40] or repulsive lattices[10] have been developed in lieu of standard optical tweezer arrays[15,16] in part to help maintain high-fidelity operations while keeping traps on.

Despite finding that our Rydberg state is anti-trapped (with a magnitude roughly equal to that of the ground state trapping) at our clock-magic wavelength of $\lambda_T$=813.4 nm[38], we observe high-fidelity entanglement even when the tweezers remain on during Rydberg interrogation. Certain factors make this situation favorable for alkaline-earth atoms. One is the ability to reach lower temperatures using narrow-line cooling, which suppresses thermal dephasing due to trap light shifts. Furthermore, a lower temperature allows for ramping down of tweezers to shallower depths before atoms are lost, further alleviating dephasing. Finally, access to higher Rabi frequencies provides faster and less light-shift-sensitive entangling operations.

We study short-time blockaded Rabi oscillations both with the tweezers switched off (FIG. 4a) and left on (FIG. 4b). We find similar fidelities for the $\pi$- and $2\pi$-pulses in both cases (Table I). Further, we estimate a lower bound for the Bell state fidelity in the tweezer on case, and find uncorrected and corrected values of 0.975(3) and 0.987(4), respectively. We expect further improvements in shorter-wavelength tweezers for which the Rydberg states of AEAs are trapped[41], and our observations show promise for Rydberg-based quantum computing in a standard tweezer array[15,16].

Our work bridges the gap between the fields of Rydberg atom arrays and optical clocks[25], opening the door to Rydberg-based quantum-enhanced metrology[26,27], including the programmable generation of spin-squeezed states[28] in recently demonstrated tweezer clocks[35,36], and quantum clock networks[29]. Further, the demonstrated entangling operations provide a mechanism for two-qubit gates in AEA-based quantum computation and simulation architectures leveraging optical and nuclear qubits[30,31]. More generally, the observed entanglement fidelities could enable gate fidelities for long-lived ground states approaching fault-tolerant error correction thresholds[42]. In addition, the high Rydberg- and ground-state detection-fidelities could play an important role in applications based on sampling from bit-string probability distributions[37,43]. Finally, by auto-ionizing the Rydberg electron with high fidelity and noting that we expect the remaining ion to stay trapped, we have found a potential new approach to the optical trapping of ions[44,45] in up to three dimensional arrays[17,46]. Such a platform has been proposed for ion-based quantum computing[47] as well as for hybrid atom-ion systems[48-50].

Example Methods for Rydberg Array Embodiment

We briefly summarize the relevant features of our $^{88}$Sr experiment[23,34,35]. We employ a one-dimensional array of 43 tweezers spaced by 3.6 μm. Atoms are cooled close to the transverse motional ground state using narrow line cooling[34-36], with an average occupation number of $n_r \approx 0.3$ ($Tr \approx 2.5$ μK), in tweezers of ground-state depth $U_0 \approx k_B \times 450$ μK$\approx$h$\times$9.4 MHz with a radial trapping frequency of $\omega_r \approx 2\pi \times$ 78 kHz.

For state preparation (FIG. 1a), we drive from the $5s^{2\,1}S_0$ absolute ground state (labeled |a>) to the $5s5p\,^3P_0$ clock state (labeled |g>) with a narrow-line laser[35], reaching Rabi frequencies of $\Omega_C \approx 2\pi \times 3.5$ kHz in a magnetic field of $\approx$710 G[52,53] (otherwise set to $\approx$71 G for the entire experiment). We populate g with a $\pi$-pulse reaching a loss-corrected fidelity of 0.986(2), which we supplement with incoherent pumping (after adiabatically ramping down the tweezer depth to $U_F$=$U_0$/10) to obtain a clock state population without and with loss correction of 0.997(1) and 0.998(1), respectively. This value is similar to, or higher than, the state preparation fidelities achieved with alkali atoms[10-12,54].

We treat the long-lived state |g> as a new ground state, from which we drive to the $5s61s\,^3S_1$, $m_J$=0 Rydberg state (labeled |r>). The Rydberg transition occurs at a wavelength of $\lambda_R$=316.6 nm and we use a $1/e^2$ beam radius of 18(1) μm. We readily achieve a |g>↔|r> Rabi frequency of $\Omega_R \approx 2\pi \times$ 6–7 MHz, corresponding to $\approx$30 mW, and up to $\Omega_R \approx 2\pi \times 13$ MHz with full optimization of the laser system and beam path. To detect atoms in |r> we drive the strong transition to $5p_{3/2}61s_{1/2}$(J=1, mJ=+/–1), labelled |r*>. This transition excites the core ion, which then rapidly autoionizes the Rydberg electron. The ionized atoms are dark to subsequent detection of atoms in g with the high-fidelity scheme described in Ref.[34], providing the means to distinguish ground and Rydberg atoms. We switch off the ramped-down tweezers during the Rydberg pulse[6,7] after which we apply an auto-ionization pulse while rapidly increasing the depth back to U0 for subsequent read-out.

The Rydberg and clock laser beams are linearly polarized along the magnetic field axis, and the auto-ionization beam is linearly polarized perpendicular to the magnetic field axis. Accordingly, we excite to auto-ionizing states with mJ=+/–1. The tweezers are linearly polarized along the axis of propagation of the Rydberg, clock, and auto-ionization beams perpendicular to the magnetic field axis.

Process Steps

Figure 5:
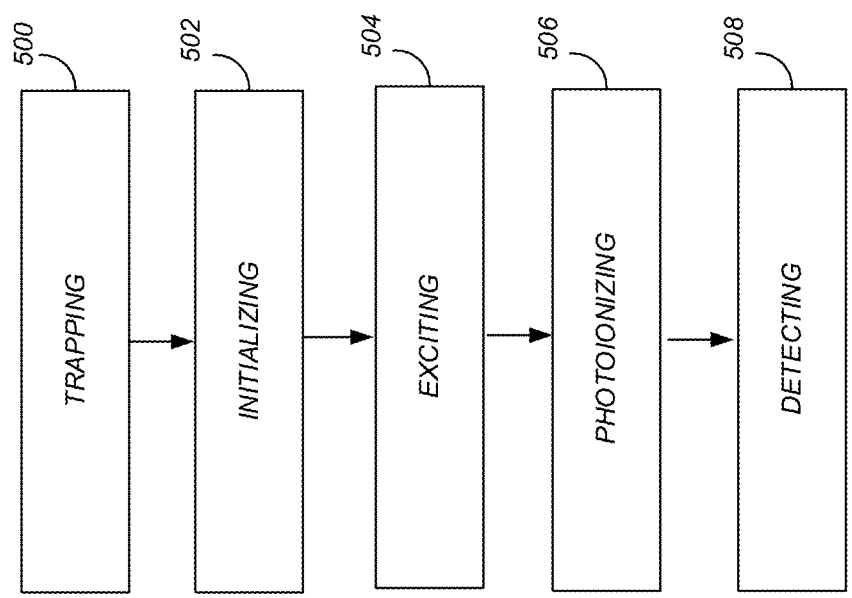
FIG. 5. Flowchart illustrating a method of creating and measuring entangled states.

FIG. 5 is a flowchart illustrating a method for fabricating, and method for operating an apparatus for creating and measuring states of an entangled system.

Block 500 represents trapping or providing trap trapping a pair of interacting multi-level systems, each of systems comprising: a ground state |g>; a state |r>, wherein the interacting is such that excitation to the state |r> in one of the systems prevents excitation to the state |r> in the other of the systems; and an intermediate state |r*>.

Block 502 represents optionally initializing the system(s) in the state |g>.

Block 504 represents exciting and/or entangling the systems by emitting one or more first electromagnetic fields tuned to excite a first transition between the ground state |g> and the state |r>, wherein the excitation of the first transition creates an entangled system comprising an entanglement of the pair of interacting multi-level systems.

Block 506 represents photoionizing and/or emitting one or more second electromagnetic fields tuned between the state |r> and the intermediate state |r*> to excite a second transition to the state |r*> so that any population of the systems in |r*> are dark to a subsequent detection of a population in the systems in |g>, providing a means to distinguish the entangled system in the state |g> and the entangled system in the state |r>. During the detection, population in state |g> appears bright whereas the |r*> state is dark.

Block 508 represents performing the detection of whether there is a population of the entangled system in the ground state |g>.

Illustrative, non-exclusive examples of inventive subject matter according to the present disclosure are described in the following examples (referring also to FIGS. 1-9).

1. An apparatus 104 useful for creating and measuring states of an entangled system, comprising:
a pair of interacting multi-level systems 102, each of systems comprising:

a ground state |g>;

a state |r>, wherein the interacting is such that excitation to the state |r> in one of the systems prevents excitation to the state |r> in the other of the systems; and an intermediate state |r*>, wherein a population of the systems in state |r*> does not decay to the state |g>;

one or more sources 106 of coherent electromagnetic radiation coupled to the systems 102 and emitting:

one or more first electromagnetic fields 108 tuned to excite a first transition between the ground state |g> and the state |r>, wherein the excitation of the first transition creates an entangled system 103 comprising an entanglement of the pair of interacting multi-level systems;

one or more second electromagnetic fields 110 tuned between the state |r> and the intermediate state |r*> to excite a second transition to the state |r*> so that any population of the systems in |r*> are dark to a subsequent detection of a population in the systems in |g>, providing a means to distinguish the entangled system in the state |g> and the entangled system in the state |r>; and a detection system 112 performing the detection of whether there is a population of the entangled system in the ground state |g>.

2. The apparatus of example 1, wherein:

each of the systems 102 include:

an auxiliary state |a>, such that the entangled system in state |g> does not decay to the auxiliary state |a> and a transition from the auxiliary state |a> to the state |r> is forbidden; and a state |f> having an energy higher than state |a>, such that the intermediate state |r*> is not electromagnetically coupled to the state |f>;

the one or more sources 106 of coherent electromagnetic radiation emit:

one or more third 114 electromagnetic fields:

exciting a third transition from the ground state |g> to state |f>; or exciting a fourth transition from the ground state |g> to the auxiliary state |a> and then a fifth transition from auxiliary state |a> to the state |f>; and the detection system comprises a detector 116 and the one or more sources 106 emitting one or more fourth electromagnetic fields 118 exciting a sixth transition from the auxiliary state |a> to the state |f>, such that the detector detecting spontaneous emission 120 from the state |f> in response to excitation of the sixth transition indicates a population of the entangled system in the ground state |g>.

3. The apparatus of example 1 or example 2, wherein the systems 102 comprise Rydberg atoms, the state |r> is a Rydberg state, and the pair of Rydberg atoms are separated by a distance less than or equal to a Rydberg blockade radius so that the interacting comprises a Rydberg blockade.

4. The apparatus of example 3, wherein the systems 102 comprise alkaline earth atoms or alkaline earth-like atoms.

5. The apparatus of example 4, wherein the atoms comprise Strontium, Ytterbium, or an atom having two valence electrons including one electron that can be excited from the core and one electron that can be in the state |r>.

6. The apparatus of example 3, wherein:

the state |r> is defined as $n_G s n_R s\ ^3S_1$, where $n_R \geq 30$ is the principal quantum number of the |r> state, $n_G$ is the principal quantum number of the ground state |g>, s is the angular momentum quantum number, and S is a term symbol representing the total orbital angular momentum quantum number of the multi-electron atom;

the state |g> is defined as $n_G s n_G p\ ^3P_0$, where p is the angular momentum quantum number, and P is the total orbital angular momentum quantum number for the multi-electron atom; and the intermediate state |r*> is defined as $n_G s n_R s\ ^3S_1$.

7. The apparatus of any of the examples 1-6, further comprising a trap 122 comprising trapping potentials trapping an array 128 of the multi-level systems 102 (a plurality of the pairs of the systems 102), each of the trapping potentials trapping a single one of the atoms.

8. The apparatus of example 7, wherein the trap 122 comprises optical tweezers.

9. The apparatus of example 7, further comprising a controller (e.g., a computer, e.g., CPU) controlling the trapping potentials so that the detection mechanism 112 measures whether there is a population of the entangled system in the ground state |g> while the systems are trapped in the trapping potentials.

10. A device 150 comprising quantum computer, a sensor, a clock, or a quantum simulator comprising or coupled to the apparatus 104 of any of the examples 1-9.

11. The apparatus 102 of any of the examples 1-10, wherein the detection mechanism 112 is used to measure a state of a qubit comprising the ground state |g> and the state |r>.

12. The apparatus of any of the examples 1-11, wherein the interaction, preventing excitation to the state |r> in one of the systems prevents when there is excitation to the state |r> in the other of the systems, comprises a dipole interaction, an electrostatic interaction, or an electromagnetic interaction.

13. The apparatus of any of the examples 1-13, wherein |r*> is a short-lived compared to timescale for a transition from |r> to |g> (e.g., at least 100 times faster) and/or |r*> is an autoionizing state.

14. The apparatus of any of the examples 1-13, wherein |r*> transitions to a dark state of the system faster than a transition from |r*> to |r>.

15. The apparatus of any of the examples 1-14, wherein the systems 102 comprise atoms, quantum dots, defects in solid state, a superconductor, or a charge qubit circuit.

16. The apparatus wherein the electromagnetic fields are outputted from one or a plurality of lasers.

17. The apparatus of any of the examples 2-16, wherein the |a> state comprises a $^1S_0$ state, the |g> state comprises a $^3P_0$ state and the |r> state comprises a $^3S_1$ state.

ADVANTAGES AND IMPROVEMENTS

Embodiments of the present invention establish a novel platform for highly-anticipated quantum science applications, including programmable quantum-enhanced optical clocks and fault-tolerant quantum computing.

In one or more examples, the novel approach comprises the excitation and detection of alkaline-earth atoms excited to Rydberg states that differ from existing approaches for alkali atoms and alkaline-earth atoms; specifically, our approach uses the two valence electrons of alkaline-earth atoms for single-photon Rydberg excitation from a metastable clock state as well as for autoionization detection of Rydberg atoms. We combine these techniques with atom-by-atom assembly to obtain arrays of many non-interacting atoms or pairs of interacting atoms operating in parallel.

The techniques introduced in this disclosure enable achieving record fidelities for Rydberg state detection, coherent operations between the ground- and Rydberg-state, and Rydberg-based two-atom entanglement. Furthermore, the techniques introduced in this invention enable performing high-fidelity entanglement operations without turning the optical traps off, an important step for gate-based quantum computing.

Embodiments of the present invention can have a long-lasting impact in at least four separate directions:

1. Bridging the gap between the fields of Rydberg atom arrays and optical clocks by opening the door to Rydberg-based quantum-enhanced metrology, including the programmable generation of spin-squeezed states in tweezer clocks and quantum clock networks.

2. Providing a mechanism for fault-tolerant two-qubit gates in Rydberg-based quantum computing architectures, including usage of nuclear and optical qubits in alkaline-earth atoms;

3. Enabling high-fidelity evolution and readout in applications based on sampling from bit string probability distributions, such as supremacy tests and quantum optimization;

4. Introducing a new approach to optical trapping of ions in up to three dimensional arrays. Such a platform has been proposed for ion-based quantum computing as well as for hybrid atom-ion systems.

REFERENCES

The following references are incorporated by reference herein.

[1] Saffman, M., Walker, T. G. and Molmer, K. Quantum information with Rydberg atoms. Rev. Mod. Phys. 82, 2313-2363 (2010).
[2] Browaeys, A., Barredo, D. and Lahaye, T. Experimental investigations of dipole-dipole interactions between a few Rydberg atoms. J. Phys. B At. Mol. Opt. Phys. 49, 152001 (2016).
[3] Saffman, M. Quantum computing with atomic qubits and Rydberg interactions: progress and challenges. J. Phys. B At. Mol. Opt. Phys. 49, 202001 (2016).
[4] Browaeys, A. and Lahaye, T. Many-body physics with individually controlled Rydberg atoms. Nat. Phys. (2020).
[5] Schauß, P. et al. Crystallization in Ising quantum magnets. Science 347, 1455-1458 (2015).
[6] Labuhn, H. et al. Tunable two-dimensional arrays of single Rydberg atoms for realizing quantum Ising models. Nature 534, 667-670 (2016).
[7] Bernien, H. et al. Probing many-body dynamics on a 51-atom quantum simulator. Nature 551, 579-584 (2017).
[8] Jau, Y. Y., Hankin, A. M., Keating, T., Deutsch, I. H. and Biedermann, G. W. Entangling atomic spins with a Rydberg-dressed spin-flip blockade. Nat. Phys. 12, 71-74 (2016).
[9] Levine, H. et al. High-Fidelity Control and Entanglement of Rydberg-Atom Qubits. Phys. Rev. Lett. 121, 123603 (2018).
[10] Graham, T. M. et al. Rydberg-Mediated Entanglement in a Two-Dimensional Neutral Atom Qubit Array. Phys. Rev. Lett. 123, 230501 (2019).
[11] Levine, H. et al. Parallel Implementation of High-Fidelity Multiqubit Gates with Neutral Atoms. Phys. Rev. Lett. 123, 170503 (2019).
[12] Omran, A. et al. Generation and manipulation of Schrodinger cat states in Rydberg atom arrays. Science 365, 570-574 (2019).
[13] Monz, T. et al. 14-Qubit Entanglement: Creation and Coherence. Phys. Rev. Lett. 106, 130506 (2011).
[14] Song, C. et al. Generation of multicomponent atomic Schrodinger cat states of up to 20 qubits. Science 365, 574-577 (2019).
[15] Barredo, D., de Leseleuc, S., Lienhard, V., Lahaye, T. and Browaeys, A. An atom-by-atom assembler of defect-free arbitrary two-dimensional atomic arrays. Science 354, 1021-1023 (2016).
[16] Endres, M. et al. Atom-by-atom assembly of defect-free one-dimensional cold atom arrays. Science 354, 1024-1027 (2016).
[17] Kumar, A., Wu, T. Y., Giraldo, F. and Weiss, D. S. Sorting ultracold atoms in a three-dimensional optical lattice in a realization of Maxwell's demon. Nature 561, 83-87 (2018).
[18] de Leseleuc, S., Barredo, D., Lienhard, V., Browaeys, A. and Lahaye, T. Analysis of imperfections in the coherent optical excitation of single atoms to Rydberg states. Phys. Rev. A 97, 053803 (2018).
[19] DeSalvo, B. J. et al. Rydberg-blockade effects in Autler-Townes spectra of ultracold strontium. Phys. Rev. A 93, 022709 (2016).
[20] Gaul, C. et al. Resonant Rydberg Dressing of Alkaline-Earth Atoms via Electromagnetically Induced Transparency. Phys. Rev. Lett. 116, 243001 (2016).
[21] Lochead, G., Boddy, D., Sadler, D. P., Adams, C. S. and Jones, M. P. A. Number-resolved imaging of excited-state atoms using a scanning autoionization microscope. Phys. Rev. A 87, 053409 (2013).
[22] Norcia, M. A., Young, A. W. and Kaufman, A. M. Microscopic Control and Detection of Ultracold Strontium in Optical-Tweezer Arrays. Phys. Rev. X 8, 041054 (2018).
[23] Cooper, A. et al. Alkaline-Earth Atoms in Optical Tweezers. Phys. Rev. X 8, 041055 (2018).
[24] Saskin, S., Wilson, J. T., Grinkemeyer, B. and Thompson, J. D. Narrow-Line Cooling and Imaging of Ytterbium Atoms in an Optical Tweezer Array. Phys. Rev. Lett. 122, 143002 (2019).
[25] Ludlow, A. D., Boyd, M. M., Ye, J., Peik, E. and Schmidt, P. O. Optical atomic clocks. Rev. Mod. Phys. 87, 637-701 (2015).
[26] Gil, L. I. R., Mukherjee, R., Bridge, E. M., Jones, M. P. A. and Pohl, T. Spin Squeezing in a Rydberg Lattice Clock. Phys. Rev. Lett. 112, 103601 (2014).
[27] Kessler, E. M. et al. Heisenberg-Limited Atom Clocks Based on Entangled Qubits. Phys. Rev. Lett. 112, 190403 (2014).
[28] Kaubruegger, R. et al. Variational Spin-Squeezing Algorithms on Programmable Quantum Sensors. Phys. Rev. Lett. 123, 260505 (2019).
[29] K'om'ar, P. et al. A quantum network of clocks. Nat. Phys. 10, 582-587 (2014).
[30] Daley, A. J., Boyd, M. M., Ye, J. and Zoller, P. Quantum Computing with Alkaline-Earth-Metal Atoms. Phys. Rev. Lett. 101, 170504 (2008).
[31] Gorshkov, A. V. et al. Alkaline-Earth-Metal Atoms as Few-Qubit Quantum Registers. Phys. Rev. Lett. 102, 110503 (2009).
[32] Kaufman, A. M. et al. Entangling two transportable neutral atoms via local spin exchange. Nature 527, 208-211 (2015).
[33] Welte, S., Hacker, B., Daiss, S., Ritter, S. and Rempe, G. Photon-Mediated Quantum Gate between Two Neutral Atoms in an Optical Cavity. Phys. Rev. X 8, 011018 (2018).

[34] Covey, J. P., Madjarov, I. S., Cooper, A. and Endres, M. 2000-Times Repeated Imaging of Strontium Atoms in Clock-Magic Tweezer Arrays. Phys. Rev. Lett. 122, 173201 (2019).

[35] Madjarov, I. S. et al. An Atomic-Array Optical Clock with Single-Atom Readout. Phys. Rev. X 9, 041052 (2019).

[36] Norcia, M. A. et al. Seconds-scale coherence on an optical clock transition in a tweezer array. Science 366, 93-97 (2019).

[37] Pichler, H., Wang, S. T., Zhou, L., Choi, S. and Lukin, M. D. Quantum Optimization for Maximum Independent Set Using Rydberg Atom Arrays. arXiv:1808.10816 (2018).

[38] See Supplementary Information.

[39] Vaillant, C. L., Jones, M. P. A. and Potvliege, R. M. Long-range Rydberg-Rydberg interactions in calcium, strontium and ytterbium. J. Phys. B At. Mol. Opt. Phys. 45, 135004 (2012).

[40] Barredo, D. et al. Three-dimensional trapping of individual Rydberg atoms in ponderomotive bottle beam traps. arXiv:1908.00853 (2019).

[41] Mukherjee, R., Millen, J., Nath, R., Jones, M. P. A. and Pohl, T. Many-body physics with alkaline-earth Rydberg lattices. J. Phys. B At. Mol. Opt. Phys. 44, 184010 (2011).

[42] Knill, E. Quantum computing with realistically noisy de-vices. Nature 434, 39-44 (2005).

[43] Arute, F. et al. Quantum supremacy using a programmable superconducting processor. Nature 574, 505-510 (2019).

[44] Karpa, L., Bylinskii, A., Gangloff, D., Cetina, M. and Vuleti'c, V. Suppression of Ion Transport due to Long-Lived Subwavelength Localization by an Optical Lattice. Phys. Rev. Lett. 111, 163002 (2013).

[45] Huber, T., Lambrecht, A., Schmidt, J., Karpa, L. and Schaetz, T. A far-off-resonance optical trap for a Ba+ ion. Nat. Commun. 5, 5587 (2014).

[46] Barredo, D., Lienhard, V., de L'es'eleuc, S., Lahaye, T. and Browaeys, A. Synthetic three-dimensional atomic structures assembled atom by atom. Nature 561, 79-82 (2018).

[47] Cirac, J. I. and Zoller, P. A scalable quantum computer with ions in an array of microtraps. Nature 404, 579-581 (2000).

[48] Engel, F. et al. Observation of Rydberg Blockade Induced by a Single Ion. Phys. Rev. Lett. 121, 193401 (2018).

[49] Mukherjee, R. Charge dynamics of a molecular ion immersed in a Rydberg-dressed atomic lattice gas. Phys. Rev. A 100, 013403 (2019).

[50] Langin, T. K., Gorman, G. M. and Killian, T. C. Laser cooling of ions in a neutral plasma. Science 363, 61-64 (2019).

[51] Wilson, J. et al. Trapped arrays of alkaline earth Rydberg atoms in optical tweezers. arXiv:1912.08754 (2019).

[52] Taichenachev, A. et al. Magnetic Field-Induced Spectroscopy of Forbidden Optical Transitions with Application to Lattice-Based Optical Atomic Clocks. Phys. Rev. Lett. 96, 083001 (2006).

[53] Barber, Z. et al. Direct Excitation of the Forbidden Clock Transition in Neutral 174Yb Atoms Confined to an Optical Lattice. Phys. Rev. Lett. 96, 083002 (2006).

[54] Wang, Y., Kumar, A., Wu, T. Y. and Weiss, D. S. Single-qubit gates based on targeted phase shifts in a 3D neutral atom array. Science 352, 1562-1565 (2016).

[55] Cooke, W. E., Gallagher, T. F., Edelstein, S. A. and Hill, R. M. Doubly Excited Autoionizing Rydberg States of Sr. Phys. Rev. Lett. 40, 178-181 (1978).

[56] Itano, W. M., Heinzen, D. J., Bollinger, J. J. and Wineland, D. J. Quantum Zeno effect. Phys. Rev. A 41, 2295-2300 (1990).

[57] Zhu, B. et al. Suppressing the Loss of Ultracold Molecules Via the Continuous Quantum Zeno Effect. Phys. Rev. Lett. 112, 070404 (2014).

[58] Leibfried, D. et al. Creation of a six-atom 'Schrodinger cat' state. Nature 438, 639-642 (2005).

[59] Anderson, D. Z., Frisch, J. C. and Masser, C. S. Mirror reflectometer based on optical cavity decay time. Appl. Opt. 23, 1238 (1984).

[60] Nagourney, W. Quantum Electronics for Atomic Physics and Telecommunication. OUP Oxford, 2 ed. (2014). ISBN 0191643386.

[61] Weber, S. et al. Calculation of Rydberg interaction potentials. J. Phys. B At. Mol. Opt. Phys. 50, 133001 (2017).

[62] Further information on one or more embodiments of the present invention can be found in High-fidelity entanglement and detection of alkaline-earth Rydberg atoms Ivaylo S. Madjarov*, Jacob P. Covey*, Adam L. Shaw, Joonhee Choi, Anant Kale, Alexandre Cooper, Hannes Pichler, Vladimir Schkolnik, Jason R. Williams, Manuel Endres *Nature Physics* 16, 857-861 (2020), which reference is incorporated by reference herein.

Supplementary Information for Example with Rydberg Atoms

The ground state |g> of our Rydberg qubit is the 5s5p $^3P_0$ metastable clock state of $^8$Sr. We populate this state in two stages: first, most atoms are transferred via a coherent π-pulse on the clock transition. Thereafter, any remaining population is transferred via incoherent pumping. In our regime where the Rabi frequency of the clock transition ($\Omega_c \approx 2\pi \times 3.5$ kHz) is significantly smaller than the trapping frequency ($\omega_r \approx 2\pi \times 78$ kHz), coherent driving is preferable to incoherent pumping because it preserves the motional state of an atom, i.e., it does not cause heating. However, atomic temperature, trap frequency, trap depth, and beam alignment contribute to the transfer infidelity of coherent driving. Although we drive the clock transition on the motional carrier in the sideband resolved regime, thermal dephasing still plays an important role. Particularly, each motional state has a distinct Rabi frequency, a thermal ensemble of which leads to dephasing[1]. This thermal dephasing is less severe at higher trapping frequencies; however, this can only be achieved in our system by using deeper traps, which would also eventually limit transfer fidelity because of higher rates of Raman scattering out of the clock state. We therefore perform coherent transfer initially in deeper traps (≈450 μK), followed immediately by an adiabatic ramp down to one-tenth of that depth. Finally, precise alignment of the clock beam to the tight, transverse axis of the tweezer is important to ensure that no coupling exists to axial motion, which has a much lower trap frequency and thus suffers more thermal dephasing than the transverse direction. The remaining population is transferred by simultaneous, incoherent driving of the 5s2 $^1S_0 \leftrightarrow$ 5s5p $^3P_1$, 5s5p $^3P_1 \leftrightarrow$ 5s6s $^3S_1$, and 5s5p $^3P_2 \leftrightarrow$ 5s6s $^3S_1$ transitions for 1 ms. This pumping scheme has the clock state as a unique dark state via the decay of 5s6s $^3S_1$ to the clock state and is in general more robust than coherent driving. However, due to photon recoil, differential trapping, and an unfavorable branching ratio of 5s6s $^3S_1$ to the clock state (requiring many absorption and emission cycles), this process causes significant heating, making it unfavorable as compared to coherent driving. Therefore, we only use this method as a secondary step to transfer atoms left behind by the coherent drive. We measure the fidelity of our state transfer by applying a 750 μs pulse of intense light resonant with the $^1S_0 \leftrightarrow {}^1P_1$ transition immediately after state transfer. The large recoil force of this pulse rapidly pushes out atoms in $^1S_0$ with a fidelity of ≥0.9999 while leaving atoms in the clock state intact. Upon repumping the clock state back into our imaging cycle and imaging the remaining atoms, we obtain a measure of the fraction of atoms that were successfully transferred to the clock state. With coherent driving alone, we measure a state transfer fidelity of 0.986(2), while adding incoherent pumping increases this value to 0.998(1). Both of these values are corrected for loss to quantify state transfer in isolation; however, loss also contributes to infidelity of the overall state preparation. Taking loss into account, as well as the probability of the atom Raman scattering out of the clock state in the finite time between clock transfer and Rydberg excitation (see Sec. C), our overall state preparation fidelity with both coherent driving and incoherent pumping is $F^{SP}$=0.997(1).

B. Auto-Ionization and Rydberg State Detection Fidelity

The auto-ionization beam is resonant with the Sr+ ionic transition $^2S_{1/2} \leftrightarrow {}^2P_{3/2}$ at $\lambda_A$=407.6 nm. The $1/e^2$ beam waist radius is $w^A_o$=16(1) μm with power $P_A$=2.8(4) mW, from which we estimate a Rabi frequency of $\Omega_A \approx 2\pi \times 3$ GHz. To quantify the Rydberg state detection fidelity of our auto-ionization scheme, we compare the observed autoionization loss 1/e timescale of $\tau_A$=35(1) ns to the expected lifetime[2] of |r>, which is $\tau_{|r1>} \approx 80$ μs. That is, we compute the probability that an atom in the Rydberg state is auto-ionized before it decays away from the Rydberg state. This estimate places an upper bound on the detection fidelity of |r> to be 0.9996(1), where the uncertainty is dominated by an assumed uncertainty of ±20 μs in $\tau_{|r>}$. Note that when the auto-ionization pulse is not applied, there is still a residual detection fidelity of |r> of 0.873(4) due to anti-trapping of |r> in the tweezer (this value is smaller than the reported <0.98 for alkalis in part because the atoms are colder here than in other work[3]. A lower bound on our detection fidelity is given by the measured π-pulse fidelity after correcting for errors in preparation and ground state detection, which gives 0.9963(9). We drive the auto-ionizing ion core transition with an intensity that would produce a highly saturated Rabi frequency of $\Omega_A \approx 2\pi \times 3$ GHz in the bare ion. However, the fast auto-ionization rate[4,5] $\Gamma_A > \Omega_A$ of |r*> actually inhibits the |r>↔||r*> transition via the continuous quantum Zeno mechanism[6,7]. In this regime, the effective auto-ionization rate of the transition continues to scale with $\Omega^2_A$ and does not saturate until $\Omega_A \gg \Gamma_A$. This is in qualitative agreement with the fact that our measured auto-ionization loss rate continues to increase with beam intensity. Furthermore, the finite rise time of the acousto-optic modulator (AOM) that we use for switching the auto-ionization beam is a limiting factor in achieving faster auto-ionization. Therefore, detection fidelity can be increased further with higher beam intensity as well as faster beam switching.

C. State Preparation and Measurement (Spam) Correction

At the end of a Rydberg excitation and auto-ionization sequence, we perform state readout by imaging the absence (0) or presence (1) of atoms. We infer the final state of the atom by mapping this binary detection value to the atomic state as 0→|r> and 1→|g>. However, imperfections in state preparation, imaging fidelity, and state-selective readout produce errors in this mapping. State preparation and measurement (SPAM) correction attempts to isolate quantities of the pertinent physics (in this case, Rydberg excitation) from such errors. In particular, we can determine, assuming an atom is perfectly initialized in the ground state |g>, what is the probability that it is in |r> after a certain Rydberg excitation pulse.

1. Preparation, Excitation, and Measurement Processes

We begin by assuming that an atom/pair has been registered as present via imaging at the start of the experiment and that it has no detected neighbors within a two tweezer spacing. If an atom/pair does not fulfill this criterion, it is omitted from our data. For the sake of simplicity, we will assume that there are no errors in this initial detection stage. In particular, the combination of high imaging fidelity and high array rearrangement fidelity make errors of this kind exceptionally unlikely. Imaging an atom involves a small probability that the atom will be lost, even if it scatters enough photons to be detected. We denote by S the probability that a detected atom survives the first image. After this image, surviving atoms are transferred from the absolute ground state |a> to the clock state |g> (the ground state of our Rydberg qubit) with a probability of successful transfer denoted by K. There is a small probability L that during this transfer atoms are lost. The rest, which are not lost but not successfully transferred, remain in |a⟩ with a probability 1−L−K. The possibilities enumerated up to this point are represented graphically in Extended Data FIG. 6 under "Preparation". At this point, atoms that have been successfully prepared in |g> undergo Rydberg excitation. In the single atom case, they end up in the Rydberg state |r> with a probability $P^c_r$. For the two atom case, assuming that both atoms have been successfully prepared, there are four possible states in the two-qubit space, with probabilities given by $P^c_{rr}$, $P^c_{rg}$, $P^c_{gr}$, $P^c_{gg}$. Our ultimate goal will be to solve for these values, which we call "SPAMcorrected", indicated here with a superscript c. In the two atom case, there is the possibility that one atom is successfully prepared while the other is not. In this case, we expect the successfully prepared atom to execute single-atom dynamics. In the case of Rabi oscillations, the Rabi frequency will be reduced by a factor of √2. We can thus estimate the Rydberg excitation probability of the prepared atom as $P^c_{r*} = P^c_r|_{\Omega_f = \pi} \cos^2(\Omega t/2)$, where Ω is the single-atom Rabi frequency and t is the pulse length. Of particular interest are the cases $\Omega t = \pi/\sqrt{2}$ and $\Omega t = 2\pi/\sqrt{2}$, corresponding to the two atom π and 2π pulses, respectively. After excitation follows measurement, which involves making Rydberg atoms dark to imaging (i.e., either putting them in a state that scatters no photons or expelling them from the trap) and imaging the remaining bright atoms. In our case, we make Rydberg atoms dark via auto-ionization. We denote by D the probability that a Rydberg atom is successfully made dark to imaging.

Furthermore, we denote by $F_0$ the probability of correctly imaging the absence of a bright atom (true negative) and by $F_1$ the probability of correctly imaging the presence of a bright atom (true positive). $1-F_0$ gives the probability of a false positive, and $1-F_1$ gives the probability of a false negative. Let $P_1$ be the probability of an atom being detected as present (bright) at the end of the experiment, and similarly let $P_{00}$, $P_{01}$, $P_{10}$, $P_{11}$ be the corresponding probabilities for atom pairs (with the sum of these being 1). These are the raw, measured values referred to as "uncorrected" in the main text and hereafter.

2. Determining SPAM Probabilities

We now discuss the determination of the various probabilities discussed. While some of these quantities are directly measurable, some must be estimated from measurements that themselves need SPAM correction. All probabilities entering into SPAM correction calculations are summarized in Extended Data Table I. We determine $F_0$ and $F_1$ by analyzing the histogram of detected photons from a typical set of images, similarly to the method described in Ref.[8]. The histograms have a zero- and one-atom peak, and we determine false positives and false negatives by the area of these peaks that extends beyond the binary detection threshold. Loss during imaging that leads to false negatives is also taken into account in $F_1$.[8] Error bars are given by the standard deviation across the array. We determine S by taking two consecutive images. We measure the value $S_0$, defined as the probability of detecting an atom in the second image conditional on its detection in the first. Obtaining the true value of S from $S_0$ requires correcting for false positives and false negatives in the second image (where we assume false positives in the first image are negligible). One can write $S_0$ as the sum of atoms that survived and were correctly positively identified and that did not survive and were incorrectly positively identified. Solving for S gives:

Extended Data Table I | SPAM probabilities.

| Probability | Symbol | Value |
| --- | --- | --- |
| Imaging true negative | $F_0$ | 0.99997(5) |
| Imaging true positive | $F_1$ | 0.9988(7) |
| Uncorrected survival | $S_0$ | 0.9979(3) |
| Corrected survival | S | 0.9991(7) |
| Uncorrected $|g\rangle$ transfer | $K_0$ | 0.997(1) |
| Raman scattering to $|a\rangle$ | R | 0.00104(1) |
| Corrected $|g\rangle$ transfer | K | 0.998(1) |
| Loss during $|g\rangle$ transfer | L | 0.0008(8) |
| Rydberg state detection | D | 0.9996(1) |

$$S = \frac{S_0 + F_0 - 1}{F_0 + F_1 - 1} \quad (1)$$

By a similar procedure, we determine K from a value $K_0$ measured by performing state transfer, using a ground-state push-out pulse as described in Sec. A, repumping to the ground state, and measuring the probability of detecting an atom in a subsequent image. To obtain the true K, we correct $K_0$ for imaging errors as well as survival probability after imaging. We furthermore modify K with the probability R that a successfully transferred atom goes back to $|a\rangle$ due to trap Raman scattering in the time delay between state transfer and Rydberg excitation. We estimate R=0.00104(1) by a measure of the lifetime in the clock state at our tweezer depth[9]. We obtain:

$$K = \frac{K_0 + F_0 - 1}{S_0 + F_0 - 1}(1 - R). \quad (2)$$

We note that the total clock state preparation fidelity, an important quantity on its own, can be expressed as F SP=SK=0.997(1). To measure the transfer loss probability L, we perform state transfer without a pushout pulse, then repump atoms to the ground state and measure how many were lost (again correcting for imaging loss and imaging errors). Finally, we determine D by comparing the measured auto-ionization timescale to an estimate of the Rydberg lifetime, as described in Sec. B. We assume all decay from the Rydberg state is into bright states and therefore leads to detection errors, which is physically motivated by the large branching ratio of our Rydberg state to the 5s5p $^3P_J$ manifold, whose states are repumped into our imaging cycle.

We neglect other processes that may make a Rydberg atom go dark, such as anti-trapping or decay into dark states, as these are expected to have a much longer timescale.

3. Correcting the Single-Atom Excitation Probabilities

We are now ready to solve for $P^c_r$ in terms of the uncorrected value $P_1$ and the various SPAM probabilities. For clarity, it will be convenient to define variables for the populations of the four possible single-atom states that an atom can be in at the end of Rydberg excitation: lost, $|a\rangle$, $|g\rangle$ and $|r\rangle$. We will call these populations pl, pa, pg and pr, respectively, with their values determined by the probability tree in Extended Data FIG. 6 and summarized in Extended Data Table II.

Extended Data Table II | Possible states for a single atom. Note that the sum of these populations equals unity.

| State | Symbol | Value |
| --- | --- | --- |
| Lost | $p_l$ | $(1 - S) + SL$ |
| $|a\rangle$ (absolute ground state) | $p_a$ | $S(1 - L - K)$ |
| $|g\rangle$ (clock state) | $p_g$ | $SK(1 - P^c_r)$ |
| $|r\rangle$ (Rydberg state) | $p_r$ | $SKP^c_r$ |

Figure 6:
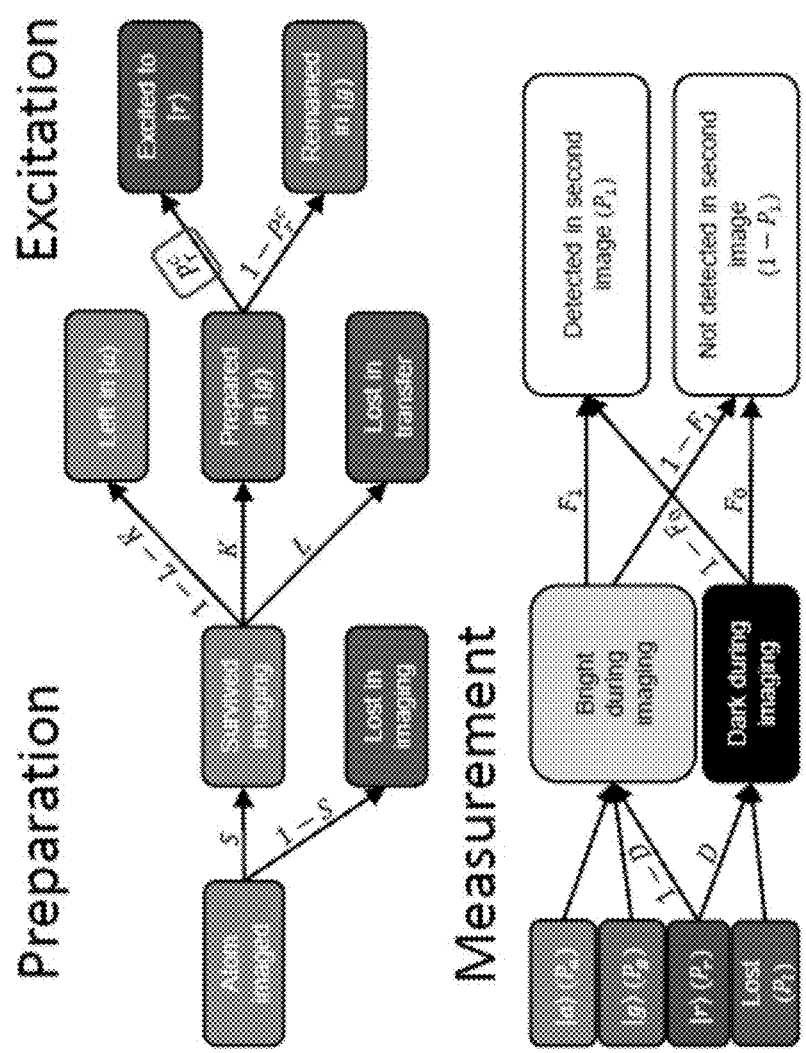
FIG. 6 Probability tree for single-atom SPAM correction. Atomic states are color-coded as blue for jai (absolute ground state), red for |g> (clock state), purple for |r> (Rydberg state), and dark-gray for lost. Quantities above arrows indicate probabilities. The SPAM corrected quantity of interest, $P^c_r$, is highlighted in a purple box.
Figure 7:
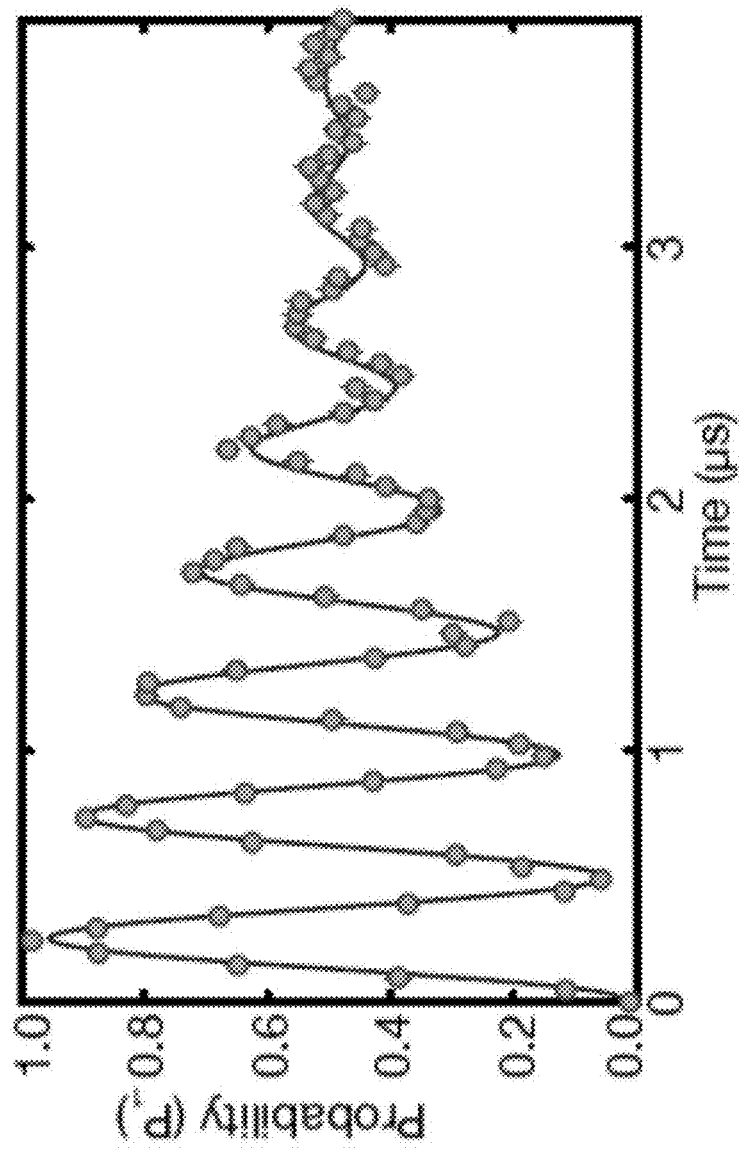
FIG. 7 Ramsey interferometry. We use a detuning of 2 MHz between the two pulses to show oscillations with a characteristic 1/e decay time τRamsey≈2 μs. A sine-modulated Gaussian decay is used for the fit (solid line). Data is uncorrected and averaged over ≈40 experimental cycles per timestep and over an array of approximately 14 atoms. Error bars indicate a 1a binomial confidence interval.

We can write $P_1$ as a sum of true positive identifications of bright states plus false positive identification of dark states (see "Measurement" in Extended Data FIG. 6). In terms of the values defined so far, we have:

$$P_1 = (p_a + p_g + p_r(1-D))F_1 + (p_l + p_r D)(1-F_0). \quad (3)$$

Substituting in the full expression for the populations from Extended Data Table II and solving for P c r, we obtain:

$$P^c_r = \frac{SF_1 + (1-S)(1-F_0) - LS(F_0 + F_1 - 1) - P_1}{KSD(F_0 + F_1 - 1)}. \quad (4)$$

For the single-atom short-time Rabi oscillations reported in Table I of the main text, we observe the bare values of $P_1(\pi)=0.0049(9)$ and $P_1(2\pi)=0.9951(9)$, yielding SPAM-corrected pulse fidelities of $F^{SPAM}(\pi)=P^c_r(\pi)=0.9967(9)$ and $F^{SPAM}(2\pi)=1-P^c_r(2\pi)=0.998(1)$, respectively.

4. Correcting the Two-Atom Excitation Probabilities

For the two-atom case, there are 16 possible states for an atom pair. Similarly to Extended Data Table II, we can write populations of each of these states in terms of the survival and transfer fidelities in Extended Data Table I, as shown in Extended Data Table III. We now write the experimentally measured quantities P10, P00, and P11 in terms of the values in Tables I and III.

Extended Data Table III | Possible states for two atoms. Note that the sum of these populations equals unity. Terms inside { } have an implied symmetric partner, e.g. $p_{al} = p_{la}$.

| States | Symbol | Value |
| --- | --- | --- |
| Lost, Lost | $p_{ll}$ | $((1 - S) + SL)^2$ |
| {Lost, $|a\rangle$} | $p_{la}$ | $((1 - S) + SL)S(1 - L - K)$ |
| {Lost, $|g\rangle$} | $p_{lg}$ | $((1 - S) + SL)SK(1 - P^c_{r^*})$ |
| {Lost, $|r\rangle$} | $p_{lr}$ | $((1 - S) + SL)SKP^c_{r^*}$ |
| $|aa\rangle$ | $p_{aa}$ | $S^2(1 - L - K)^2$ |

Extended Data Table III | Possible states for two atoms. Note that the sum of these populations equals unity. Terms inside { } have an implied symmetric partner, e.g. $p_{al} \equiv p_{la}$.

| States | Symbol | Value |
|---|---|---|
| {$\|ag\rangle$} | $p_{ag}$ | $S(1-L-K)SK(1-P_{r*}^c)$ |
| {$\|ar\rangle$} | $p_{ar}$ | $S(1-L-K)SKP_{r*}^c$ |
| $\|gg\rangle$ | $p_{gg}$ | $S^2K^2(1-P_{rg}^c-P_{gr}^c-P_{rr}^c)$ |
| $\|gr\rangle$ | $p_{gr}$ | $S^2K^2P_{gr}^c$ |
| $\|rg\rangle$ | $p_{rg}$ | $S^2K^2P_{rg}^c$ |
| $\|rr\rangle$ | $p_{rr}$ | $S^2K^2P_{rr}^c$ |

For notational simplicity we define $\overline{F}_0 \equiv (1-F_0)$, and similarly for Fj and D:

$$P_{10} = p_{ll}(\overline{F}_0 F_0) + p_{la}(\overline{F}_0 \overline{F}_1) + p_{al}(F_1 F_0) + \tag{5}$$
$$p_{lg}(\overline{F}_0 \overline{F}_1) + p_{gl}(F_1 F_0) + p_{lr}(\overline{F}_0 F_0 D + \overline{F}_0 \overline{DF}_1) +$$
$$p_{rl}(\overline{F}_0 DF_0 + F_1 \overline{DF}_0) + p_{aa}(F_1 \overline{F}_1) + p_{ag}(F_1 \overline{F}_1) +$$
$$p_{ga}(F_1 \overline{F}_1) + p_{ar}(F_1 DF_0 + F_1 \overline{DF}_1) + p_{ra}(F_1 \overline{DF}_1 + \overline{F}_0 DF_1) +$$
$$p_{gg}(F_1 \overline{F}_1) + p_{gr}(F_1 DF_0 + F_1 \overline{DF}_1) + p_{rg}(F_1 \overline{DF}_1 + \overline{F}_0 DF_1) +$$
$$p_{rr}(F_1 \overline{DF}_0 D + \overline{F}_0 \overline{DF}_1 \overline{D} + \overline{F}_0 F_0 D^2 + F_1 \overline{F}_1 \overline{D}^2),$$

$$P_{00} = p_{ll}(F_0^2) + p_{la}(F_0 \overline{F}_1) + p_{al}(\overline{F}_1 F_0) + p_{lg}(F_0 \overline{F}_1) + \tag{6}$$
$$p_{gl}(\overline{F}_1 F_0) + p_{lr}(F_0^2 D + F_0 \overline{F}_1 \overline{D}) + p_{rl}(F_0^2 D + \overline{F}_1 \overline{DF}_0) +$$
$$p_{aa}(\overline{F}_1^2) + p_{ag}(\overline{F}_1^2) + p_{ga}(\overline{F}_1^2) + p_{ar}(\overline{F}_1 F_0 D + \overline{F}_1^2 \overline{D}) +$$
$$p_{ra}(\overline{F}_1^2 \overline{D} + F_0 D\overline{F}_1) + p_{gg}(\overline{F}_1^2) + p_{gr}(\overline{F}_1 F_0 D + \overline{F}_1^2 \overline{D}) +$$
$$p_{rg}(\overline{F}_1^2 \overline{D} + F_0 D\overline{F}_1) + p_{rr}(\overline{F}_1^2 \overline{D}^2 + F_0 \overline{DF}_1 \overline{D} + F_0^2 D^2 + \overline{F}_1 \overline{DF}_0 D),$$

$$P_{11} = p_{ll}(\overline{F}_0^2) + p_{la}(\overline{F}_0 F_1) + p_{al}(F_1 \overline{F}_0) + p_{lg}(\overline{F}_0 F_1) + \tag{7}$$
$$p_{gl}(F_1 \overline{F}_0) + p_{lr}(\overline{F}_0^2 D + \overline{F}_0 F_1 \overline{D}) + p_{rl}(\overline{F}_0^2 D + F_1 \overline{DF}_0) +$$
$$p_{aa}(F_1^2) + p_{ag}(F_1^2) + p_{ga}(F_1^2) + p_{ar}(F_1 \overline{F}_0 D + F_1^2 \overline{D}) +$$
$$p_{ra}(F_1^2 \overline{D} + \overline{F}_0 DF_1) + p_{gg}(F_1^2) + p_{gr}(F_1 \overline{F}_0 D + F_1^2 \overline{D}) +$$
$$p_{rg}(F_1^2 \overline{D} + \overline{F}_0 DF_1) + p_{rr}(F_1^2 \overline{D}^2 + \overline{F}_0 DF_1 \overline{D} + \overline{F}_0^2 D^2 \overline{D} + F_1 \overline{DF}_0 D).$$

Note that $P_{01} = 1 - P_{10} - P_{00} - P_{11}$. Thus, with the three above equations, we can solve for $P^c_{gg}$, $P^c_{rg}$, $P^c_{gr}$, and $P^c_{rr}$. The full expressions for these solutions are cumbersome and not shown. The experimentally measured values $P_{00}$, $P_{10}$, $P_{01}$ and $P_{11}$ are reported in Extended Data Table IV. Extended Data Table IV Extended Data Table IV | Experimentally measured two-atom values. Uncorrected values used to calculate $P_{gg}^c$, $P_{rg}^c$, $P_{gr}^c$, and $P_{rr}^c$ at both the $\pi$- and $2\pi$-times. The 'T' superscript indicates the values for which the traps were on. We report the values of $P_{10}$ and $P_{01}$ in symmetrized and antisymmetrized form, where $P_{\{10\}} = P_{10} + P_{01}$ and $P_{[10]} = P_{10} - P_{01}$

| Variable | Value |
|---|---|
| $P_{\{10\}}(\pi)$ | 0.992(2) |
| $P_{[10]}(\pi)$ | 0.01(1) |
| $P_{00}(\pi)$ | 0.0032(7) |
| $P_{11}(2\pi)$ | 0.989(2) |
| $P_{[10]}(2\pi)$ | 0.004(2) |
| $P_{00}(2\pi)$ | 0.0036(7) |

Extended Data Table IV | Experimentally measured two-atom values. Uncorrected values used to calculate $P_{gg}^c$, $P_{rg}^c$, $P_{gr}^c$, and $P_{rr}^c$ at both the $\pi$- and $2\pi$-times. The 'T' superscript indicates the values for which the traps were on. We report the values of $P_{10}$ and $P_{01}$ in symmetrized and antisymmetrized form, where $P_{\{10\}} = P_{10} + P_{01}$ and $P_{[10]} = P_{10} - P_{01}$

| Variable | Value |
|---|---|
| $P_{\{10\}}^T(\pi)$ | 0.992(2) |
| $P_{[10]}^T(\pi)$ | 0.004(10) |
| $P_{00}^T(\pi)$ | 0.0032(7) |
| $P_{11}^T(2\pi)$ | 0.0985(2) |
| $P_{[10]}^T(2\pi)$ | −0.003(2) |
| $P_{00}^T(2\pi)$ | 0.0030(6) |

D. Bell State Fidelity

1. Bounding the Bell State Fidelity

Characterizing the state of a quantum system is of fundamental importance in quantum information science. Canonical tomographic methods addressing this task require a measurement of a complete basis set of operators. Such measurements are often expensive or not accessible. More economic approaches can be employed to assess the overlap with a given target state. For example the overlap of a two-qubit state with a Bell state is routinely determined by measuring the populations in the four computational basis states (yielding the diagonal elements of the density operator), in addition with a measurement that probes off-diagonal elements via parity oscillations[3,10]. To access the latter it is however necessary to perform individual, local operations on the qubits. Here, we present a bound on the Bell state fidelity that can be accessed with only global control and measurements in the computational basis and elaborate on the underlying assumptions. Specifically, we are interested in the overlap F of the experimentally created state ρ with a Bell state of the form $|W\varphi\rangle = 1/\sqrt{2}(|gr\rangle + e^{i\varphi}|rg\rangle)$. This is defined as $$\mathcal{F} = \max_\phi \langle W_\phi | \rho | W_\phi \rangle = \frac{1}{2}(\rho_{gr,gr} + \rho_{rg,rg} + 2|\rho_{gr,rg}|). \tag{8}$$

Here we denote matrix elements of a density operator ρ in the two-atom basis by $\rho_{i,j} = \langle i|\rho|j\rangle$, with i, j ∈ {gg, gr, rg, rr}. Clearly, a measurement of F requires access to the populations in the ground and Rydberg states $\rho_{i,i}$ as well as some of the coherences $\rho_{i,j}$ with i≠j. While populations are direct observables (in particular, we identify $\rho_{i,i}$ with our measured values $P_i$ or their SPAM corrected counterparts $P^c_i$), coherences are not. We can however bound the fidelity F from below via a bound on $|\rho_{gr,rg}|$. Namely, it can be shown via Cauchy's inequality $|\rho_{a,b}|^2 \leq \rho_{a,a}\rho_{b,b}$ and the normalization of states $\Sigma_i \rho_{i,i} = 1$ that $$|\rho_{gr,rg}|^2 \geq \frac{1}{2}(tr\{\rho^2\} - 1) + \rho_{gr,rg}\rho_{rg,rg} \tag{9}$$

where tr $\{\rho^2\} = \Sigma_{i,j} |\rho_{i,j}|^2$ is the purity. Evaluating the bound given by equation Eq. (9) requires access to the purity (or a lower bound thereof). One can bound the purity from below by the populations in the ground and Rydberg states as $$tr\{\rho^2\} \geq \sum_i (\rho_{i,i})^2. \tag{10}$$

In general Eq. (10) is a very weak bound. In particular, it does not distinguish between a pure Bell state $|\psi_\phi\rangle$ and the incoherent mixture of the two states $|gr\rangle$ and $|rg\rangle$. However, if the state $\rho$ is close to one of the four atomic basis states (as is the case at the $2\pi$ time of the Rabi evolution), the bound Eq. (10) becomes tight. This fact allows us to obtain a lower bound for the purity of the Bell state in the experiment as follows. The Bell state in our protocol is generated by evolving the state $|gg\rangle$ for a time $T=\pi/\Omega^-_R$ in the Rydberg-blockade regime. Note that the same evolution should lead to a return to the initial state at time 2T in the ideal case. Under the assumption that a coupling to the environment decreases the purity of the quantum system (see further exploration of this assumption in the following subsection), we can bound the purity of the state at time T by the purity of the state at time 2T, which in turn can be bounded by measurements of the atomic populations at time 2T via Eq. (10):

$$tr\{\rho(T)^2\} \geq tr\{\rho(2T)^2\} \geq \sum_i \rho_{i,i}(2T)^2. \quad (11)$$

Using this estimated bound on the purity leads to a lower bound on the Bell state fidelity F at time T solely in terms of the populations in the ground and Rydberg states at times T and 2T:

$$\mathcal{F}(T) \geq \frac{1}{2}\Big(\rho_{gr,gr}(T) + \rho_{rg,rg}(T) + 2\sqrt{\max\big(0, \big(\sum_i \rho_{i,i}(2T)^2 - 1\big)/2 + \rho_{gr,gr}(T)\rho_{rg,rg}(T)\big)}\Big). \quad (12)$$

2. Bounding an Increase in Purity Due to Spontaneous Decay

Although we make the assumption that the purity of our state does not increase between times T and 2T and assert that this assumption is reasonable, we recognize the hypothetical possibility that dissipative processes such as spontaneous emission can in principle increase the purity of quantum states. We note an increase of purity with time typically occurs only in specially engineered situations (as in optical pumping schemes), and we have no reason to believe such mechanisms are active in our system. In fact, reasonable numerical models of potential decoherence mechanisms are all consistent with a decrease of the purity. Nevertheless, we now analyze how strongly our assumption of purity decrease could potentially be violated given the spontaneous emission rate of our Rydberg state and show that the corresponding decrease of the inferred Bell state fidelity is well within our confidence interval. We assume that the system can be modeled by a Markovian Master equation of the form:

$$\dot{\rho} = \mathcal{L}\rho = \\ -i[H, \rho] + \sum_\mu \gamma_\mu \Big(c_\mu \rho c_\mu^\dagger - \frac{1}{2}\{c_\mu^\dagger c_\mu, \rho\}\Big) + \sum_\mu \bar{\gamma}_\mu \Big(h_\mu \rho h_\mu - \frac{1}{2}\{h_\mu h_\mu, \rho\}\Big) \quad (13)$$

Here we explicitly distinguish incoherent terms generated by Hermitian jump operators ($h_\mu = h^\dagger_\mu$, e.g. dephasing), and non-Hermitian jump operators ($c_\mu$, e.g. spontaneous emission). We find $$\frac{d}{dt}tr\{\rho^2\} = 2tr\{\rho(\mathcal{L}\rho)\} \leq 2\sum_\mu \gamma_\mu tr\{\rho c_\mu \rho c_\mu^\dagger - c_\mu^\dagger c_\mu \rho^2\} \quad (14)$$

which simply reflects the fact that the purity of the quantum state cannot increase due to the coherent part of the evolution or due to any incoherent part of the evolution that is generated by Hermitian jump operators (dephasing). Thus the coherent part of the evolution does not affect the bound we obtain in the end. Eq. (14) can be obtained from Eq. (13) by noting that tr $\{\rho[H, \rho]\}$=tr $\{\rho H\rho - \rho^2 H\}$=0 and tr $\{\rho[h_\mu, [\rho, h_\mu]]\}$=−tr $\{[h_\mu, \rho][\rho, h_\mu]\}$=−tr $\{([\rho, h_\mu])^\dagger [\rho, h_\mu]\}$<0, which gives Eq. (14).

Now let us assume that the non-Hermitian jump operators correspond to decay from the Rydberg state $|r\rangle$ into some set of states $\{|f\rangle|f=1, 2, \ldots n\}$ that also include the ground state $|g\rangle = |1\rangle$. The following argument works for arbitrary $n \geq 1$. Since we have two atoms we have $2n$ non-Hermitian jump operators $c_f^{(a)} = |f\rangle_a \langle r|$, where $a=1, 2$ labels the atoms. With this model we have (denoting the reduced state of atom a by $\rho^{(a)}$)

$$\frac{d}{dt}tr\{\rho^2\} \leq 2\sum_{f,a}\Gamma_f tr\Big\{\rho c_f^{(a)} \rho c_f^{(a)\dagger} - c_f^{(a)\dagger} c_f^{(a)} \rho^2\Big\} \quad (15)$$

$$= 2\sum_{f,a}\Gamma_f\Big(\rho^{(a)}_{f,f}\rho^{(a)}_{r,r} - \rho^{(a)}_{r,r}\rho^{(a)}_{r,r} - \sum_{e\neq r}\rho^{(a)}_{r,e}\rho^{(a)}_{e,r}\Big)$$

$$\leq 2\sum_{f,a}\Gamma_f\big(\rho^{(a)}_{f,f}\rho^{(a)}_{r,r} - \rho^{(a)}_{r,r}\rho^{(a)}_{r,r}\big)$$

where $\Gamma_f$ is the single-atom decay rate from $|r\rangle$ to $|f\rangle$. Note that $\rho^{(a)}_{f,f}\rho^{(a)}_{r,r} - \rho^{(a)}_{r,r}\rho^{(a)}_{r,r} = \rho^{(a)}_{r,r}(1-\rho^{(a)}_{r,r})\rho^{(a)}_{r,r} - \rho^{(a)}_{r,r} \rho^{(a)}_{r,r} \leq \frac{1}{8}$. This gives the final result $$\frac{d}{dt}tr\{\rho^2\} \leq \frac{1}{2}\sum_f \Gamma_f = \frac{1}{2}\Gamma \quad (16)$$

That is, the rate at which the purity increases is upper bounded by half the rate at which a single atom in the Rydberg state decays into other states by spontaneous emission. Over a time interval of length T the 2-atom purity can thus not increase by more than $T\Gamma/2$. Using our blockaded $\pi$-time for T and Rydberg state decay rate for $\Gamma$, we evaluate this bound on the purity increase to be $3.2 \times 10^{-4}$. This would lead to a decrease in our bound on the Bell state fidelity by $1.6 \times 10^{-4}$ for both the cases of tweezers off and tweezers on, which is significantly smaller than our quoted error for these values.

E. Rydberg Laser System

The Rydberg laser system is based on a Toptica laser, in which an extended cavity diode laser (ECDL) at $\lambda_{IR}=1266.6$ nm seeds a tapered amplifier ($\tau_A$) with output power up to $\approx 2$ W, which is then frequency doubled via second harmonic generation (SHG) in a bowtie cavity to obtain up to $\approx 1$ W at $\lambda_{Red}=633.3$ nm, which is then frequency doubled in a second bowtie cavity to obtain fourth harmonic generation (FHG) with up to $\approx 0.4$ W at $\lambda_{UV}=316.6$ nm. The fundamental laser at $\lambda_{IR}=1266.6$ nm is stabilized to an ultralow expansion (ULE) cavity system (Stable Laser Systems) of length 10 cm with finesse of $\approx 14000$ and line width (full width at half maximum) of $\approx 110$ kHz. The finesse was measured by performing cavity ringdown spectroscopy[11]. We currently do not filter the fundamental laser with the cavity[3], but we are prepared to implement this approach. Further discussion on the laser frequency stability can be found in Appendix F. We use a beam power of $P_R$=28.1(4) mW, measured immediately before it enters the vacuum cell (through 4 mm of uncoated quartz). The geometric mean $1/e^2$ waist radius of the beam at the position of the atoms is $w^R_0$=18(1) μm. These conditions correspond to the Rabi frequency used throughout the text of $\Omega_R \approx 2\pi \times 6$–7 MHz. The maximum power we can achieve is ≈110 mW, for which we observe a Rabi frequency of ≈$2\pi \times 13$ MHz. The Rydberg pulses are derived from an AOM, which limits the rise and fall time to ≈40 ns. When driving with a Rabi frequency whose n-pulse approaches this timescale ($\Omega_R \approx 2\pi \times 13$ MHz), we observe an asymmetric reduction in Rabi signal contrast by ≈1-2% at the multiples of $2\pi$, unlike conventional detuned Rabi oscillations where the contrast reduction occurs at the odd multiples of $\pi$. We attribute to early-time dynamics during the AOM switching. We do not use an optical fiber, so there is limited spatial—and thus spectral—filtering between the AOM and the atoms. Accordingly, we intentionally work with $\Omega R \approx 2\pi \times 6$–7 MHz such that the $\pi$-pulse time is sufficiently slow compared to the AOM rise and fall times. However, when operating at $\Omega R \approx 2\pi \times 13$ MHz we observe long-time coherence similar to, or slightly better than, the reported values in the main text for $\Omega_R \approx 2\pi \times 6$–7 MHz. Measured results under all conditions are consistent with the numerical analysis summarized in Extended Data FIG. 8.

F. Rydberg Decoherence Mechanisms

For a non-interacting case where Rydberg atoms in a tweezer array are well separated, the Hamiltonian H driving Rabi oscillations is $$H = \sum_{i=1}^{N} \Omega_{R,i} S_i^x + \Delta_i S_i^z, \quad (17)$$

where $\Omega_{R,i}$ and $\Delta_i$ are the Rabi frequency and the detuning for the atom at site i, $S^\mu$ are the spin-½ operators with μ=x, y, z, and N is the total number of atoms. Variations in the Rabi frequency and detuning, manifesting either as non-uniformity across the tweezer array (e.g. from non-uniform beam alignment) or as random noise, lead to a decay in the array-averaged Rabi signal. In our system, we measure a 1/e decay time of ≈7 μs at a Rabi frequency of 6 MHz (see FIG. 3a). In this section, we present a model of decoherence mechanisms that accounts for our observed decay. As a preliminary, we begin by confirming that the spatial variation of Rabi frequency across different tweezers is less than 0.2%, and that no variation of detuning across the array is observed. We conclude that non-uniformity is not a dominant contributor to our observed Rabi decay. Therefore, we focus here on three factors that induce random noise in the Rabi frequency and detuning: atomic motion, laser phase noise, and laser intensity noise. We perform Monte Carlo-based simulations[12] that take into account these noise sources as well as the finite lifetime ~80 μs of the n=61 Rydberg state due to spontaneous emission. In the following subsections, we discuss relative contributions from these noise sources.

1. Atomic Motion

An atom with a nonzero momentum shows a Doppler shift relative to the bare resonance frequency. At the beginning of Rabi interrogation, the momentum distribution, and thus the distribution of Doppler shifts, follows that of an atom in a trap. More specifically, for an atom at temperature T trapped in a harmonic potential with the radial trap frequency ω$_r$, the Doppler shift distribution can be modeled as a normal distribution with the standard deviation $\Delta_T$ $$\Delta_T = \frac{k_L}{m}\sqrt{\frac{\hbar m \omega_r}{2\tanh(\hbar \omega_r / 2 k_B T)}}, \quad (18)$$

where m is the mass of $^{88}$Sr and $k_L$ is the wavevector of the Rydberg excitation light. The radial temperature of our atomic array (along the axis of propagation of the Rydberg beam) is measured via sideband spectroscopy on the clock transition[1] to be $T_r$≈2.5 μK at a radial trap frequency of $\omega_r$≈$2\pi \times 78$ kHz. We adiabatically ramp down the trap by a factor of 10 before Rydberg interrogation, thereby reducing the temperature and the trap frequency by a factor of $\sqrt{10}$ (which we also confirm via further sideband spectroscopy). Using Eq. 18, we estimate the Doppler broadening to be $\Delta T \approx 2\pi \times 30$ kHz. At a Rabi frequency of $\Omega_R \approx 2\pi \times 6$ MHz, the expected Doppler decoherence timescale is $\tau \sim \approx_R / \Delta^2_T \approx 10$ ms, which is three orders of magnitudes longer than the measured value ~7 μs. This implies that motional effects are negligible in the Rabi decoherence dynamics.

2. Laser Phase Noise

Figure 8:
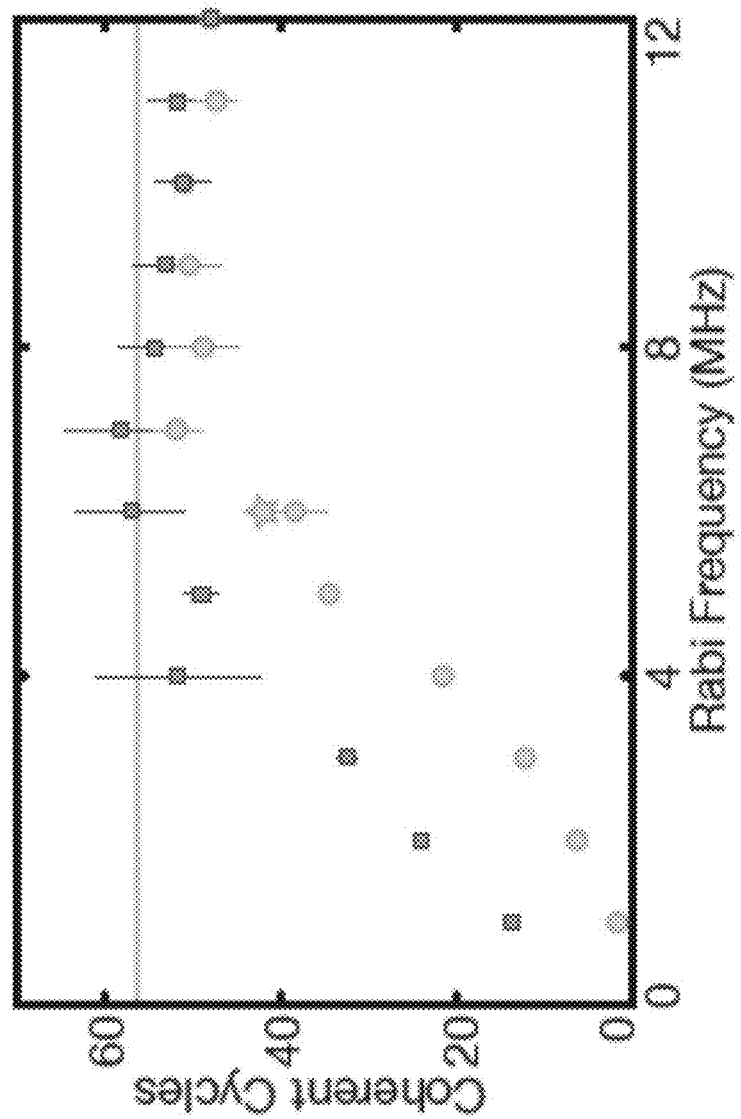
FIG. 8 Simulated and measured coherence vs Rabi frequency. The star represents the measured data shown in FIG. 3a, and the circle and square points represent numerical modeling with measured laser phase and intensity noise profiles. The yellow circles show the case when cavity phase noise filtering is not performed (as in this work), and the green squares show the case where cavity phase noise filtering is performed. The horizontal gray line shows the upper limit due to measured intensity noise fluctuations with RMS deviation of 0:8% (see Eq. (19)). Error bars indicate a 1a confidence interval.

Phase noise manifests as random temporal fluctuation of the detuning Δ in the Hamiltonian in Eq. 17. Since the frequency of the Rydberg laser is stabilized to a ULE reference cavity via the Pound-Drever-Hall (PDH) method, we use an in-loop PDH error signal derived from the cavity reflection to extract a phase noise spectrum (see Ref.[12] for the detailed procedures of phase noise extraction). The obtained noise power spectral density, predicting a RMS frequency deviation of ≈0.6 MHz after fourth-harmonic generation, allows us to generate random time-varying detuning profiles that are fed into our Monte Carlo simulations to extract a predicted decay time. Note that while the estimated laser linewidth is ∞1-10 kHz, phase noise from the servo bumps centered at $v_{SB}$≈0.6 MHz is highly relevant since $\Omega_R > v_{SB}$, and in fact dominates the RMS. Since the cavity filters phase noise beyond its linewidth, this noise is suppressed on the measured PDH signal as compared to the actual noise of the laser light that we use for Rydberg interrogation. We therefore correct our measured phase noise spectrum with a cavity roll-off factor[13] obtained from the cavity linewidth and finesse, which results in an increase in noise as compared to the uncorrected measured spectrum. However, we can also use the uncorrected spectrum to predict the phase noise we would have if we used the filtered cavity light to generate our Rydberg light via a technique described in Ref.[3]. The results in Extended Data FIG. 8 show simulated results both with and without cavity filtering. Our simulations (without cavity filtering, as in our current setup) predict a Ramsey decay time of ≈2 μs with a Gaussian envelope, which is consistent with our experimental observation. In principle, Doppler broadening ΔT could also lead to dephasing in Ramsey signals; however, the corresponding 1/e decay time is expected to be $\tau_{Ramsey}=\sqrt{2}/\Delta T=7.5$ μs, longer than the observed 2 μs, suggesting that laser phase noise is dominant over motional effects in our Ramsey signal.

3. Laser Intensity Noise

Our intensity noise predominantly originates directly from the Rydberg laser. This intensity noise is composed of both high-frequency fluctuations compared to the pulse length, and lower frequency (effectively shotto-shot) fluctuations. Using a UV avalanche photodetector (APD130A2, Thorlabs), we measure that the intensity pulse areas between different experimental trials are normally distributed with fractional standard deviation $\sigma_{RMS} \sim 1/\sqrt{L}$, where L is the pulse duration, saturating to 0.8% when L>1 μs. Note that the pulses are too fast to stabilize with an AOM during interrogation, and that we employ a sample-and-hold method. In the presence of only intensity noise following a normal distribution with fractional standard deviation $\sigma_{RMS}$, one can closely approximate the noise in the Rabi frequency to also be normally distributed and derive an analytical expression for a 1/e Rabi decay time as $\tau_{Rabi}=2\sqrt{2}/(\Omega_R \sigma_{RMS})$ where $\Omega_R$ is the nominal, noise free Rabi frequency. In the intensity noise limited regime, we thus expect a Rabi lifetime $N_{Rabi}$ (in oscillation cycles) to be Rabi frequency-independent (see the line in Extended Data FIG. 8).

$$N_{Rabi} = \frac{\Omega_R \tau_{Rabi}}{2\pi} = \frac{\sqrt{2}}{\pi \sigma_{RMS}}. \tag{19}$$

4. Summary

Including all the discussed noise sources (atomic motion, phase noise, intensity noise) as well the finite state lifetime and a Rydberg probe-induced light shift (discussed in a subsequent section), we calculate $N_{Rabi}$ as a function of drive frequency, as shown in Extended Data FIG. 8. We find that the simulated Rabi oscillation agrees well with the experimental result at a Rabi frequency of 6 MHz. While the Rabi lifetime improves with increasing Rabi frequency, it becomes saturated to $N_{Rabi} \approx 56$ at high Rabi frequencies due to intensity noise fluctuations. Interestingly, we note that there is a crossover between a phase noise-limited regime at low Rabi frequencies and an intensity noise-limited regime at higher Rabi frequencies, which for our phase and intensity noise profiles occurs at $\Omega_R \approx 2\pi \times 7$ MHz. Our numerical simulations suggest that, at Rabi frequencies less than this value, cavity phase noise filtering[3] can enhance the long-time Rabi coherence.

G. Rydberg State Systematics

1. State Identification and Quantum Defects

The Rydberg state |r> we use for this work is the 5s61s $^3S_1$ mJ=0 state of 88Sr. To confirm the quantum numbers, we measure the transition wavelengths of n=48, 49, 50, 61 for the $^3S_1$ series and of n=47, 48, 49 for the 3D1 series and find nearly perfect agreement with the values predicted by the quantum defects given in Ref[2].

2. Rydberg Probe-Induced Light Shift

Figures 9A, 9B:
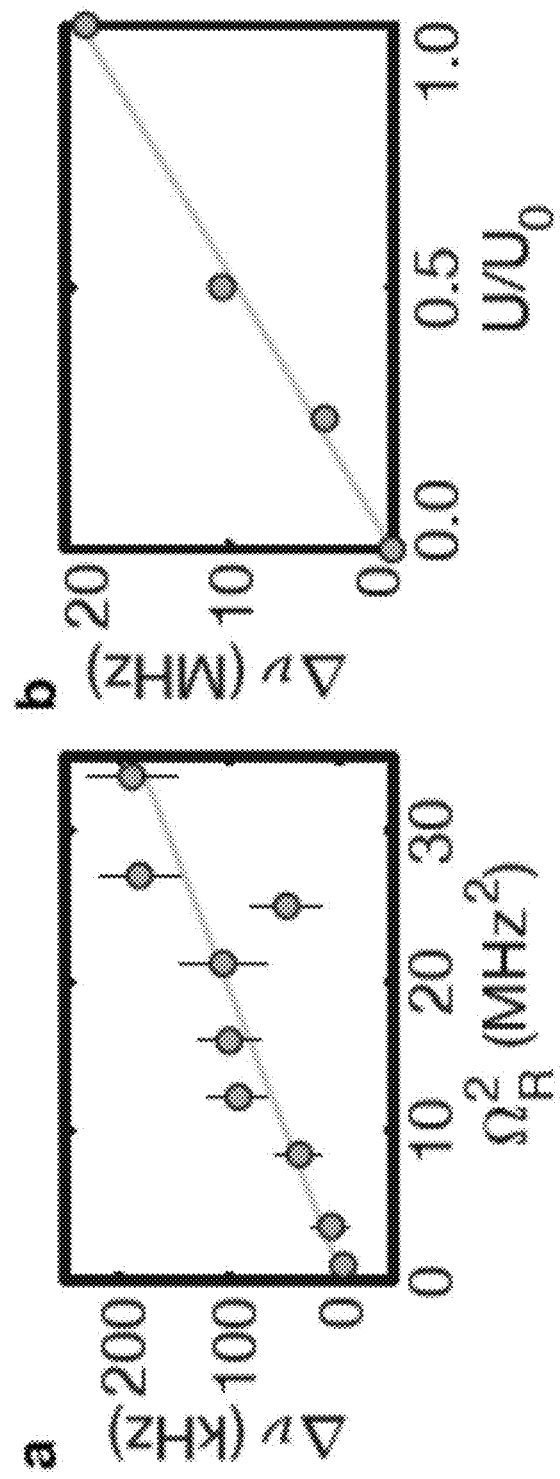
FIG. 9A-9B. Light shifts of $|r\rangle$ from the Rydberg laser and the tweezer light.

The pulse generation for our Rydberg interrogation is facilitated by switching on and off an acousto-optic modulator (AOM). However, due to the finite speed of sound in the AOM crystal, the switch-on and switch-off times are limited to tens of nanoseconds. This timescale begins to approach the timescale of our 7E-pulses for Rabi frequencies greater than ≈10 MHz. This poses a potential problem if there is also a significant intensity-dependent light shift of the resonance frequency due to the Rydberg interrogation beam. For example, a detuning that changes significantly on the timescale of the Rabi frequency could lead to non-trivial dynamics on the Bloch sphere, causing unfaithful execution of Rabi oscillations. We note that such an effect scales unfavorably with increasing Rabi frequency, as both the relevant timescale becomes shorter and the magnitude of the shift becomes quadratically larger. To measure this effect, we operate at Rabi frequencies smaller than 6 MHz to isolate the pure Rydberg probe induced light shift from any undesired AOM-related transient effects. Using the two-rail self-comparison technique described in Ref.[1], we measure the light shift induced by the Rydberg beam and find it to be described by $\Delta v = \kappa^{UV}_{|r>} \Omega^2_R$ with $\kappa^{UV}_{|r>}=5.1(7)$ kHz/MHz$^2$, as shown in FIG. 9a.

5. Tweezer-Induced Light Shift

We have demonstrated high-fidelity blockaded Rabi oscillations without extinguishing the tweezer traps. To gain a partial understanding of this observation, we measure the light shift of |r> in the tweezers with wavelength $\lambda_t=813.4$ nm and waist of wT≈800 nm. We measure the differential shift of the |g>↔|r> resonance between the dark case U=0 where the tweezers are extinguished during excitation, and the bright case with variable |g> state depth U up to $U_0 \approx 450$ μK≈h×9.4 MHz. This fit shows a linear dependence with $\Delta v = \kappa^T_{|r>} U$, where $\kappa^T_{|r>}=18.8(9)$ MHz/$U_0$. We conclude that $\kappa^T_{|r>} \approx -\kappa^T_{|g>}$ at this tweezer wavelength and waist.

6. Diamagnetic Shift from Magnetic Fields

We measure a magnetic-field-dependent shift of the Rydberg resonance that is quadratic in the magnitude of the field. We attribute this shift to the diamagnetic effect[14], which has a Hamiltonian given by $H_{dm}=\frac{1}{8}m_e|d \times B|^2$, where d is the dipole operator, B is the magnetic field, and me is the electron mass. This Hamiltonian gives rise to a first order shift in the energy that is quadratic in the magnitude of the field such that $\Delta v_{dm}=\beta|B|^2$, where β is a state dependent quantity that increases with the principal quantum number n. For 5s61s $^3S_1$ mJ=0, we experimentally measure β≈3.4 kHz/G$^2$. We compare this value to a value predicted by performing exact diagonalization of $H_{dm}$ on a limited manifold of Rydberg states in a similar fashion to Ref[14] while using quantum defects from Ref.2. This numerical procedure produces βpredicted=2.9 kHz/G$^2$ for our state, in near agreement with our measured value.

References for Supplementary Information

The following references are incorporated by reference herein.

[1] Madjarov, I. S. et al. An Atomic-Array Optical Clock with Single-Atom Readout. Phys. Rev. X 9, 041052 (2019).

[2] Vaillant, C. L., Jones, M. P. A. and Potvliege, R. M. Longrange, Rydberg-Rydberg interactions in calcium, strontium and ytterbium. J. Phys. B At. Mol. Opt. Phys. 45,135004 (2012).

[3] Levine, H. et al. High-Fidelity Control and Entanglement of Rydberg-Atom Qubits. Phys. Rev. Lett. 121, 123603 (2018).

[4] Cooke, W. E., Gallagher, T. F., Edelstein, S. A. and Hill, R. M. Doubly Excited Autoionizing Rydberg States of Sr. Phys. Rev. Lett. 40, 178{181 (1978).

[5] Lochead, G., Boddy, D., Sadler, D. P., Adams, C. S. and Jones, M. P. A. Number-resolved imaging of excited-state atoms using a scanning autoionization microscope. Phys. Rev. A 87, 053409 (2013).

[6] Itano, W. M., Heinzen, D. J., Bollinger, J. J. and Wineland, D. J. Quantum Zeno e_ect. Phys. Rev. A 41, 2295{2300 (1990).

[7] Zhu, B. et al. Suppressing the Loss of Ultracold Molecules Via the Continuous Quantum Zeno E_ect. Phys. Rev. Lett. 112, 070404 (2014).

[8] Cooper, A. et al. Alkaline-Earth Atoms in Optical Tweezers. Phys. Rev. X 8, 041055 (2018).

[9] Covey, J. P., Madjarov, I. S., Cooper, A. and Endres, M. 2000-Times Repeated Imaging of Strontium Atoms in Clock-Magic Tweezer Arrays. Phys. Rev. Lett. 122, 173201 (2019).

[10] Leibfried, D. et al. Creation of a six-atom 'Schrodinger cat' state. Nature 438, 639{642 (2005).

[11] Anderson, D. Z., Frisch, J. C. and Masser, C. S. Mirror spectrometer based on optical cavity decay time. Appl. Opt. 23, 1238 (1984).

[12] de Leseleuc, S., Barredo, D., Lienhard, V., Browaeys, A. and Lahaye, T. Analysis of imperfections in the coherent optical excitation of single atoms to Rydberg states. Phys. Rev. A 97, 053803 (2018).

[13] Nagourney, W. Quantum Electronics for Atomic Physics and Telecommunication. OUP Oxford, 2 ed. (2014). ISBN 0191643386.

[14] Weber, S. et al. Calculation of Rydberg interaction potentials. J. Phys. B At. Mol. Opt. Phys. 50, 133001 (2017).

CONCLUSION

This concludes the description of the preferred embodiment of the present invention. The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. An apparatus useful for creating and measuring states of an entangled system, comprising:
   a pair of interacting multi-level systems, each of systems comprising:
      a ground state $|g\rangle$;
      a state $|r\rangle$, wherein the interacting is such that excitation to the state $|r\rangle$ in one of the systems prevents excitation to the state $|r\rangle$ in the other of the systems; and
      an intermediate state $|r^*\rangle$, wherein a population of the systems in the intermediate state $|r^*\rangle$ does not decay to the ground state $|g\rangle$;
   one or more sources of coherent electromagnetic radiation coupled to the systems and emitting:
   one or more first electromagnetic fields tuned to excite a first transition between the ground state $|g\rangle$ and the state $|r\rangle$, wherein the excitation of the first transition creates an entangled system comprising an entanglement of the pair of interacting multi-level systems; and
   one or more second electromagnetic fields tuned between the state $|r\rangle$ and the intermediate state $|r^*\rangle$ to excite a second transition to the intermediate state $|r^*\rangle$ so that any population of the systems in intermediate state $|r^*\rangle$ are dark to a subsequent detection of a population in the systems in the ground state $|g\rangle$, providing a means to distinguish the entangled system in the ground state $|g\rangle$ and the entangled system in the state $|r\rangle$;
   a detection system performing the detection of whether there is the population of the entangled system in the ground state $|g\rangle$.

2. The apparatus of claim 1, wherein:
   each of the systems include:
      an auxiliary state $|a\rangle$, such that the entangled system in state $|g\rangle$ does not decay to the auxiliary state $|a\rangle$ and a transition from the auxiliary state $|a\rangle$ to the state $|r\rangle$ is forbidden; and
      a state $|f\rangle$ having an energy higher than the auxiliary state $|a\rangle$, such that the intermediate state $|r^*\rangle$ is not electromagnetically coupled to the state $|f\rangle$;
   the one or more sources of coherent electromagnetic radiation emit:
   one or more third electromagnetic fields:
      exciting a third transition from the ground state $|g\rangle$ to state $|f\rangle$; or
      exciting a fourth transition from the ground state $|g\rangle$ to the auxiliary state $|a\rangle$ and then a fifth transition from auxiliary state $|a\rangle$ to the state $|f\rangle$; and
   the detection system comprises a detector and the one or more sources emitting one or more fourth electromagnetic fields exciting a sixth transition from the auxiliary state $|a\rangle$ to the state $|f\rangle$, such that the detector detecting spontaneous emission from the state $|f\rangle$ in response to excitation of the sixth transition indicates the population of the entangled system in the ground state $|g\rangle$.

3. The apparatus of claim 1, wherein the systems comprise Rydberg atoms, the state $|r\rangle$ is a Rydberg state, and the pair of Rydberg atoms are separated by a distance less than or equal to a Rydberg blockade radius so that the interacting comprises a Rydberg blockade.

4. The apparatus of claim 3, wherein the auxiliary state $|a\rangle$ comprises a $^1S_0$ state, the ground state $|g\rangle$ comprises a $^3P_0$ state and the $|r\rangle$ state comprises a $^3S_1$ state.

5. The apparatus of claim 3, wherein the systems comprise alkaline earth atoms or alkaline earth-like atoms.

6. The apparatus of claim 5, wherein the atoms comprise Strontium, Ytterbium, or an atom having two valence electrons including one electron that can be excited from a core and one electron that can be in the state $|r\rangle$.

7. The apparatus of claim 3, wherein:
   the atoms each comprise a multi-electron atom;
   the state $|r\rangle$ is defined as $n_G s n_R^3 S_1$, where $n_R \geq 30$ is the principal quantum number of the $|r\rangle$ state, $n_G$ is the principal quantum number of the ground state $|g\rangle$, s is the angular momentum quantum number, and S is a term symbol representing the total orbital angular momentum quantum number of the multi-electron atom;
   the state $|g\rangle$ is defined as $n_G s n_G p^3 P_0$, where p is the angular momentum quantum number, and P is the total orbital angular momentum quantum number for the multi-electron atom; and
   the intermediate state $|r^*\rangle$ is defined as $n_G s n_R \, ^3S_1$.

8. The apparatus of claim 3, further comprising a trap comprising trapping potentials trapping an array of the multi-level systems, each of the trapping potentials trapping a single one of the atoms.

9. The apparatus of claim 8, wherein the trap comprises optical tweezers.

10. The apparatus of claim 8, further comprising a controller controlling the trapping potentials so that the detection mechanism measures whether there is the population of the entangled system in the ground state $|g\rangle$ while the systems are trapped in the trapping potentials.

11. A quantum computer, a sensor, a clock, or a quantum simulator comprising the apparatus of claim 1.

12. The apparatus of claim 1, wherein the detection mechanism is used to measure a state of a qubit comprising the ground state $|g\rangle$ and the state $|r\rangle$.

13. The apparatus of claim 1, wherein the interacting comprises an interaction, preventing excitation to the state $|r\rangle$ in one of the systems when there is excitation to the state $|r\rangle$ in the other of the systems, comprises a dipole interaction, an electrostatic interaction, or an electromagnetic interaction.

14. The apparatus of claim 1, wherein the intermediate state $|r^*\rangle$ is a short-lived compared to timescale for a transition from the state $|r\rangle$ to the state $|g\rangle$.

15. The apparatus of claim 1, wherein the intermediate state $|r^*\rangle$ transitions to a dark state of the systems faster than a transition from the state $|r^*\rangle$ to the state $|r\rangle$.

16. The apparatus of claim 1, wherein the systems comprise atoms, quantum dots, defects in solid state, a superconductor, or a charge qubit circuit.

17. A method for creating and measuring states of an entangled system, comprising:
  trapping a pair of interacting multi-level systems, each of systems comprising:
    a ground state $|g\rangle$;
    a state $|r\rangle$, wherein the interacting is such that excitation to the state $|r\rangle$ in one of the systems prevents excitation to the state $|r\rangle$ in the other of the systems; and
    an intermediate state $|r^*\rangle$;
  emitting:
    one or more first electromagnetic fields tuned to excite a first transition between the ground state $|g\rangle$ and the state $|r\rangle$, wherein the excitation of the first transition creates an entangled system comprising an entanglement of the pair of interacting multi-level systems; and
    one or more second electromagnetic fields tuned between the state $|r\rangle$ and the intermediate state $|r^*\rangle$ to excite a second transition to the intermediate state $|r^*\rangle$ so that any population of the systems in intermediate state $|r^*\rangle$ are dark to a subsequent detection of a population in the systems in $|g=$, providing a means to distinguish the entangled system in the state $|g\rangle$ and the entangled system in the state $|r\rangle$; and
  performing the detection of whether there is the population of the entangled system in the ground state $|g\rangle$.

18. The method of claim 17, wherein:
  each of the systems include:
    an auxiliary state $|a\rangle$, such that the entangled system in state $|g\rangle$ does not decay to the auxiliary state $|a\rangle$ and a transition from the auxiliary state $|a\rangle$ to the state $|r\rangle$ is forbidden; and
    a state $|f\rangle$ having an energy higher than state $|a\rangle$, such that the intermediate state $|r^*\rangle$ is not electromagnetically coupled to the state $|f\rangle$;
  the emitting further comprises one or more sources of coherent electromagnetic radiation emitting:
one or more third electromagnetic fields:
    exciting a third transition from the ground state $|g\rangle$ to state $|f\rangle$; or
    exciting a fourth transition from the ground state $|g\rangle$ to the auxiliary state $|a\rangle$ and then a fifth transition from auxiliary state $|a\rangle$ to the state $|f\rangle$; and
  the detection comprises the one or more sources emitting one or more fourth electromagnetic fields exciting a sixth transition from the auxiliary state $|a\rangle$ to the state $|f\rangle$, such that a detector detecting spontaneous emission from the state $|f\rangle$ in response to excitation of the sixth transition indicates the population of the entangled system in the ground state $|g\rangle$.

19. The method of claim 17, wherein the systems comprise Rydberg atoms, the state $|r\rangle$ is a Rydberg state, and the pair of Rydberg atoms are separated by a distance less than or equal to a Rydberg blockade radius so that the interacting comprises a Rydberg blockade.

20. The method of claim 19, wherein the atoms comprise Strontium, Ytterbium, or an atom having two valence electrons including one electron that can be excited from a core and one electron that can be in the state $|r\rangle$.

* * * * *